United States Patent
Shimizu

(10) Patent No.: US 7,502,314 B2
(45) Date of Patent: Mar. 10, 2009

(54) LABEL-SWITCHED PATH NETWORK WITH ALTERNATE ROUTING CONTROL

(75) Inventor: Hiroshi Shimizu, Tokyo (JP)

(73) Assignee: NEC Corporation (JP)

( * ) Notice: Subject to any disclaimer, the term of this patent is extended or adjusted under 35 U.S.C. 154(b) by 689 days.

(21) Appl. No.: 11/076,521

(22) Filed: Mar. 9, 2005

(65) Prior Publication Data

US 2005/0201273 A1  Sep. 15, 2005

(30) Foreign Application Priority Data

Mar. 9, 2004  (JP) ............................. 2004-065379

(51) Int. Cl.
*G01R 31/08* (2006.01)
(52) U.S. Cl. ...................... 370/227; 370/401; 370/392; 370/242; 370/389
(58) Field of Classification Search ........................ None
See application file for complete search history.

(56) References Cited

U.S. PATENT DOCUMENTS

| | | | |
|---|---|---|---|
| 6,859,842 B1 * | 2/2005 | Nakamichi et al. .......... | 709/238 |
| 7,088,717 B2 * | 8/2006 | Reeves et al. ............... | 370/392 |
| 2002/0176370 A1 * | 11/2002 | Ohba et al. .................. | 370/252 |
| 2003/0043792 A1 * | 3/2003 | Carpini et al. .............. | 370/386 |
| 2003/0126289 A1 * | 7/2003 | Aggarawal et al. .......... | 709/242 |

* cited by examiner

*Primary Examiner*—Duc C Ho
(74) *Attorney, Agent, or Firm*—Ostrolenk, Faber, Gerb & Soffen, LLP

(57) ABSTRACT

In a label-switched path communications network, each node of the network defines first and second label-switched paths between its first and second output ports and the input ports of downstream nodes. The output ports of each node are monitored. If the first output port is normal, a received packet containing a first label value is switched from any of its input ports to the first output port according to a first relationship between the first label value and the first output port. If the first output port is abnormal, the first label value of the packet is rewritten with a second label value and the packet is switched to the second output port according to a second relationship between the second label value and the second output port. The first and second label values form a pair of companion label values.

39 Claims, 16 Drawing Sheets

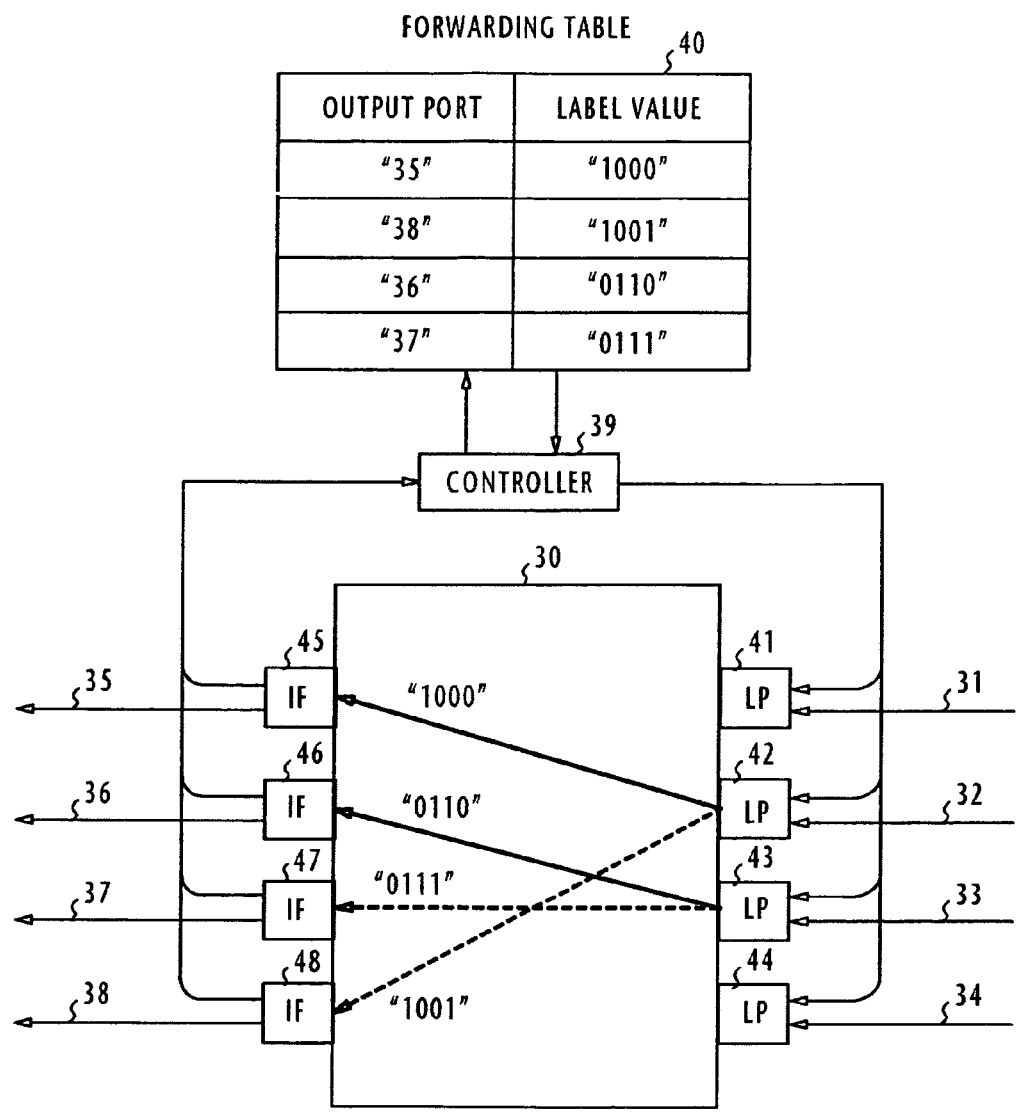

LEGEND: PATHS 17, 53, 19 = S1→S2→S3→S5
PATHS 55, 71    = S1→S2→S3→S4→S5
PATH 70         = S1→S8→S13→S9→S10→S5
PATHS 59, 20    = S1→S8→S11→S12→S5

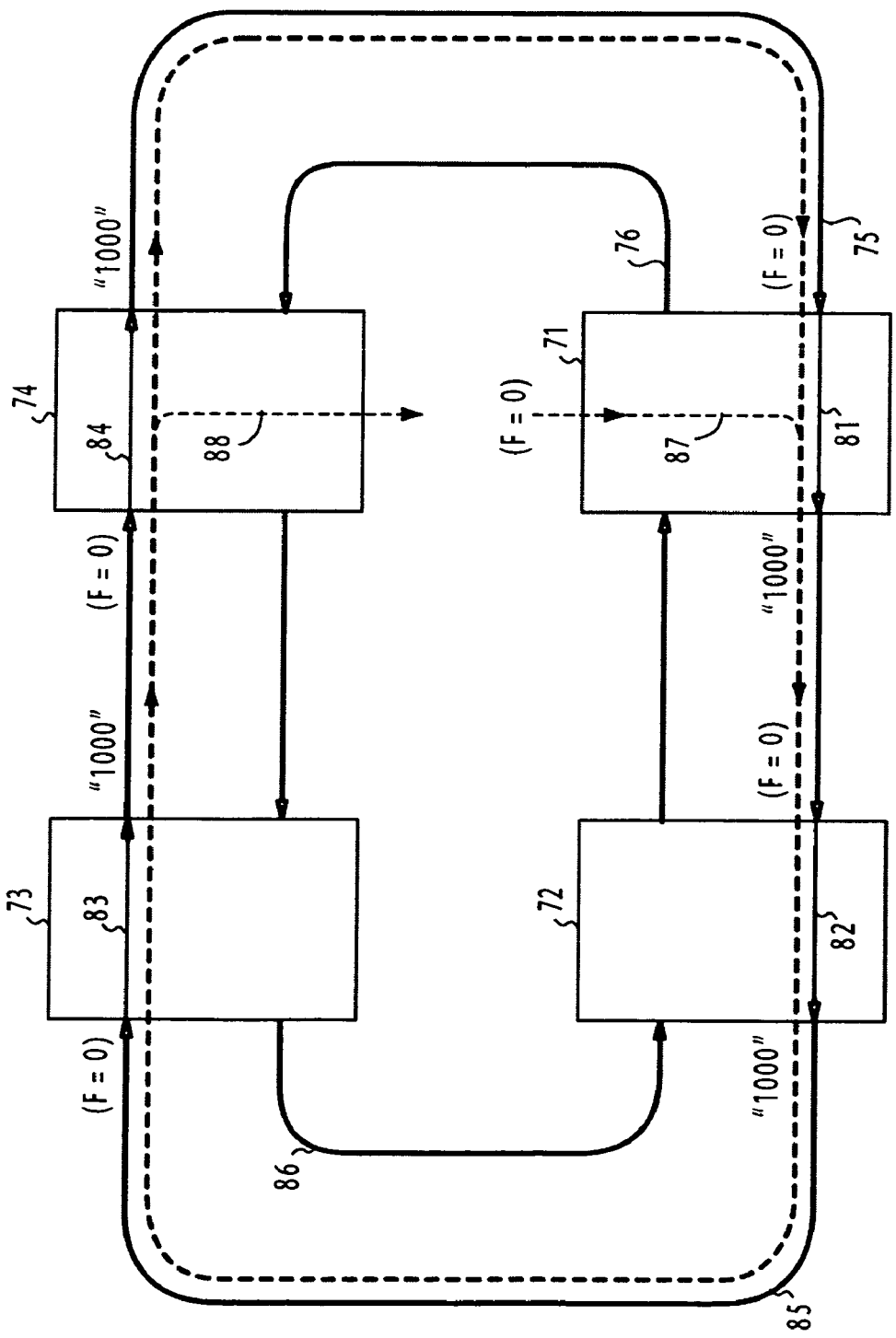

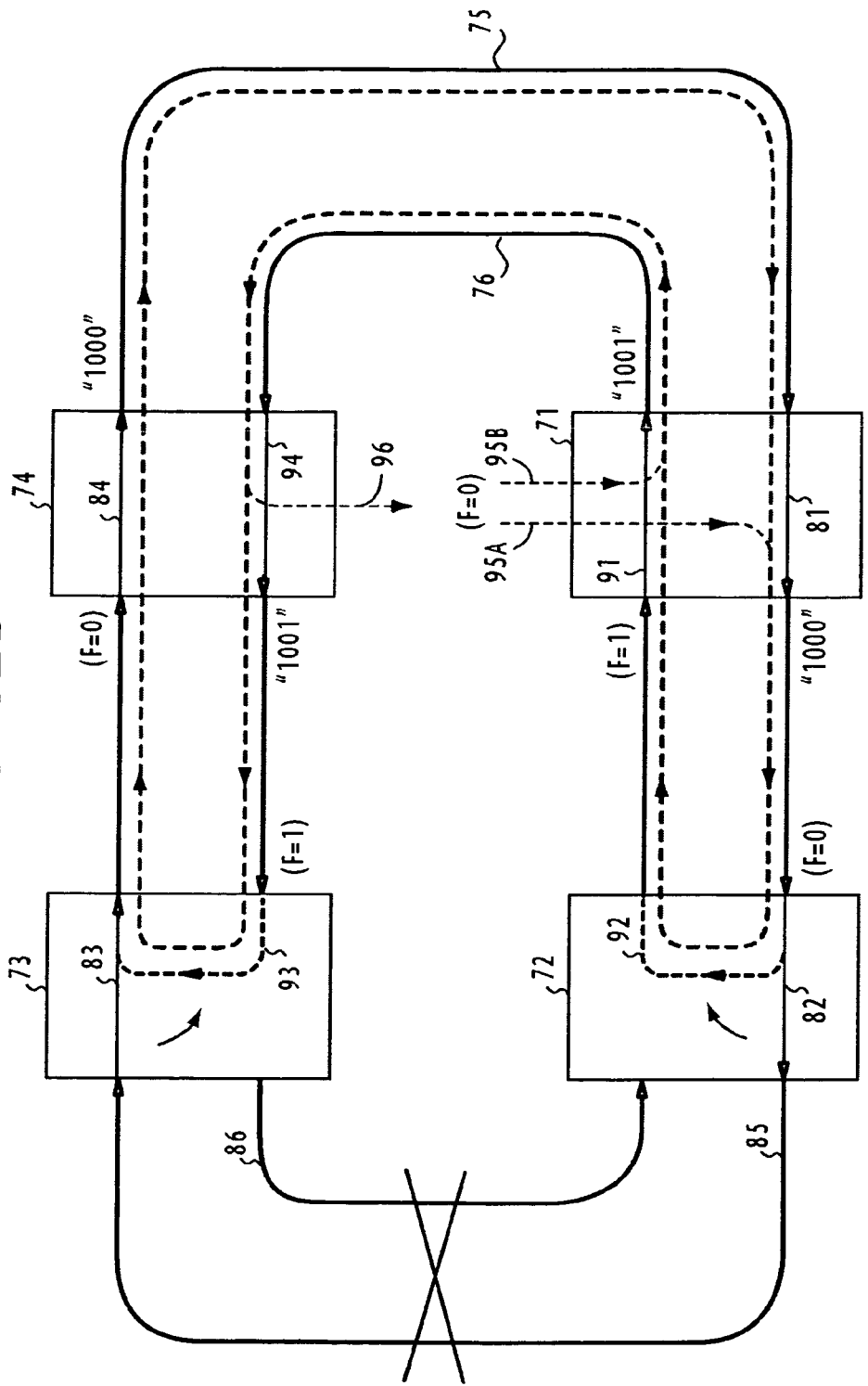

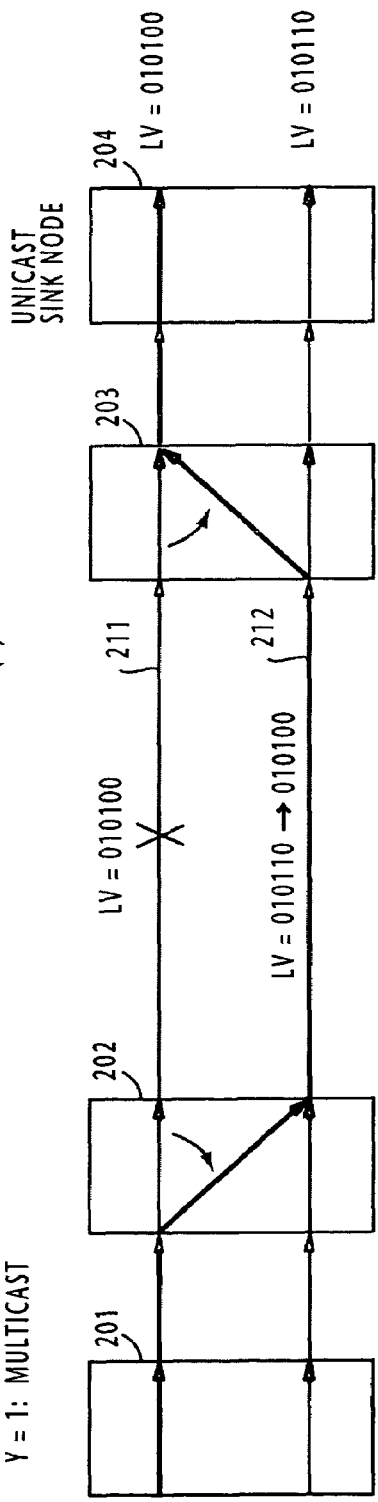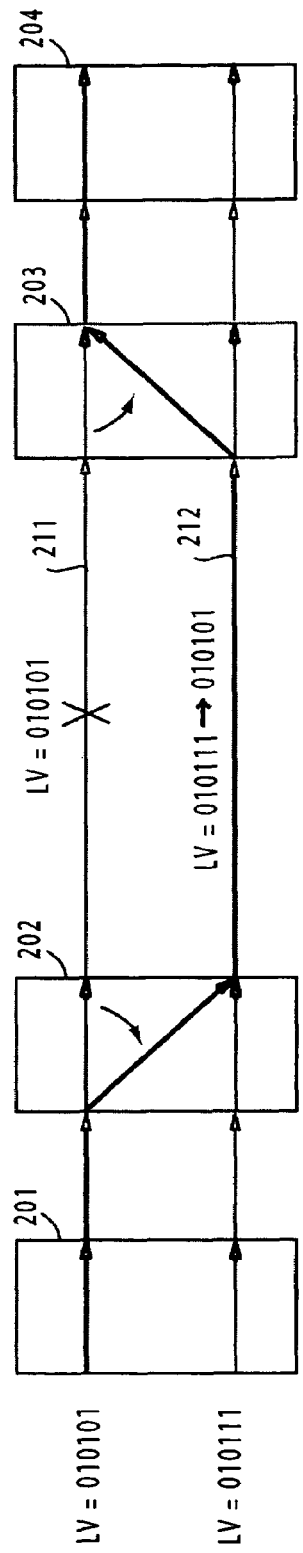

MAC ADDRESS TABLE 311

| LABEL VALUE | OUTPUT PORT 301 | OUTPUT PORT 303 | OUTPUT PORT 305 |
|---|---|---|---|
| "1000" |  | #1 | #a |
|  |  | #2 | #b |
|  |  | #3 | #c |
|  |  | ⋮ | ⋮ |
| "1001" | #p |  | #s |
|  | #q |  | #t |
|  | #r |  | #u |
|  | ⋮ |  | ⋮ |

FIG. 18

MAC ADDRESS TABLE

| LABEL VALUE | OUTPUT PORT 301 | OUTPUT PORT 303 | OUTPUT PORT 305 |
|---|---|---|---|
| "1000" | #p | #1 | #a |
|  | #q | #2 | #b |
|  | #r | #3 | #c |
|  | ⋮ | ⋮ | ⋮ |
|  |  |  | #s |
|  |  |  | #t |
|  |  |  | #u |
|  |  |  | ⋮ |
| "1001" | #p | #1 | #s |
|  | #q | #2 | #t |
|  | #r | #3 | #u |
|  | ⋮ | ⋮ | ⋮ |
|  |  |  | #a |
|  |  |  | #b |
|  |  |  | #c |
|  |  |  | ⋮ |

313

LABEL-SWITCHED PATH NETWORK WITH ALTERNATE ROUTING CONTROL

BACKGROUND OF THE INVENTION

1. Field of the Invention

The present invention relates generally to label-switch path communications networks, and more specifically to alternate routing of packets in the event of a failure on a working label-switched path.

2. Description of the Related Art

Many alternate routing methods have hitherto been developed as a solution in the event of a network failure. In an Ethernet network, messages are exchanged between switches to autonomously find alternate routes at different locations of the network. MPLS (Multi-Protocol Label Switch) is known as a traffic engineering technique using label-switched paths. Also known in the art as a high-speed alternate routing technique is the path protection technique extensively used in SDH (Synchronous Digital Hierarchy) networks. A "Resilient Packet Ring" network is standardized by the IEEE 802.17 working group. In a RPR network, "steering" and "wrapping" techniques are used in the event of a ring failure. With "steering", the ring "steers" at a source node to recover the failure from the starting point of the affected link. With the "wrapping" technique, the ring "wraps" (doubles back on itself) around the point of failure to form a single contiguous ring.

With the known spanning tree algorithm, routes are autonomously are determined by nodes. As such, management of alternate routes in advance of a network failure is impossible. Alternate routes, which may possibly be taken in the event of a failure, cannot be established on a policy base. Additionally, a substantial amount of time is taken to determine the alternate routes. With MPLS where the alternate routing is determined by the label value, the software-based label processing results in a long path switching time in comparison with the wrapping (or loopback) and path protection techniques. Since the RPR technology can only be used in ring network applications, this technology cannot be applied to Ethernet applications.

In addition, the use of the VLAN (Virtual LAN) tag of Ethernet network as a path-identifying label allows paths to be merged or branched out. However, when a given path is branched out to an alternate path, the communication disadvantageously switches to a broadcast mode until the system learns MAC addresses.

SUMMARY OF THE INVENTION

It is therefore an object of the present invention to provide a label-switched path communications network, which allows establishment of policy-based routes for alternate routing in the event of a network failure.

Another object of the present invention is to provide a label-switched path communications network, which allows wrapping and steering fault restoration techniques to be used not only in ring networks but also in networks of other types.

A further object of the present invention is to provide a label-switched path communications network, which allows implementation of the path protection, wrapping and steering techniques at high speed.

A still further object of the present invention is to provide a label-switched path communications network, which uses a universal algorithm to implement the alternate routing of label-switched path on local area networks.

A still further object of the present invention is to provide a label-switched path communications network, which reduces the amount of time taken to learn MAC addresses when protection switching occurs between a working path and an alternate path.

According to a first aspect of the present invention, there is provided a communications network for establishing a label-switched path defined by a label value contained in a packet, comprising a plurality of nodes, each of the nodes comprising a plurality of input ports, first and second output ports for respectively defining first and second label-switched paths with at least one downstream node, and switch means for monitoring the output ports and switching from any of the input ports a packet containing a first label value to the first output port according to a first relationship between the first label value and the first output port if the first output port is normal, rewriting, if the first output port is abnormal, the first label value of the packet with a second label value and switching the packet to the second output port according to a second relationship between the second label value and the second output port, the first and second label values forming a pair of companion label values.

Preferably, the switch means of a downstream node is responsive to a packet containing the second label value for rewriting this label value with the first label value if the first output port of the downstream node is normal and switching the packet to the first output port of the downstream node. If the first output port of the downstream node is abnormal, the packet is switched intact to the second output port according to the second relationship.

Preferably, the network comprises a first link for establishing the first label-switched path from the first output port of an upstream node to a first intermediate node, a second link for establishing a loopback path from the second output port of the first intermediate node to the upstream node, and a third link for establishing the second label-switched path from the second output port of the upstream node to a second intermediate node. The switch means of the first intermediate node is responsive to a packet containing the first label value from the upstream node via the first link for rewriting the first label value of the packet with the second label value if the first output port of the first intermediate node is abnormal and switching the packet to the second output port of the first intermediate node. The switch means of the upstream node is responsive to the packet from the first intermediate node for switching the packet to the second output port of the upstream node according to the second relationship. The switch means of the upstream node is responsive to the packet from the first intermediate node for storing information indicating that the first output port of the first intermediate node is abnormal and responsive to a packet containing the first label value from a downstream node for rewriting its label value with the second label value if the stored information is present and switching the packet to the second output port.

According to a second aspect, the present invention provides a communications network for establishing a label-switched path defined by a label value contained in a packet. The network comprises a plurality of nodes, each comprising a plurality of input ports, a pair of first output ports for defining a pair of first label-switched paths and a pair of second output ports for defining a pair of second label-switched paths with at least one downstream node, and switch means for monitoring the output ports. If both of the first output ports are normal, the switch means performs switching from any of the input ports oppositely traveling packets each containing the first label value to the first output ports according to a first relationship between the first label value and the first output ports. If one of the first output ports is abnormal, the switch means rewrites the first label value of one of the oppositely traveling packets with the second label value and switches the packet to one of the second output ports according to a second relationship between the second label value and the second output ports, and rewrites the second label value of the other packet of the oppositely traveling packets with the first label value and switches the other packet to the other of the first output ports according to the first relationship.

According to a third aspect of the present invention, there is provided a communications network for establishing a label-switched path defined by a label value contained in a packet, comprising a plurality of nodes, each of the nodes comprising a plurality of input ports, first and second output ports for respectively defining first and second label-switched paths with downstream nodes, and switch means for monitoring the output ports and (a) if both of the output ports are normal, switching from any of the input ports first and second parallel packets respectively containing first and second label values to the first and second output ports according to relationships between the first and second label values and the first and second output ports, and (b) if the first output port is abnormal, rewriting the first label value of the first packet with the second label value and switching both of the first and second packets to the second output port according to the relationship between the second label value and the second output port.

According to a fourth aspect of the present invention, there is provided a communications network for establishing a label-switched path defined by a label value contained in a packet. The network comprises a plurality of nodes each comprising a plurality of input ports, a plurality of output ports for defining a plurality of label-switched paths with at least one downstream node, and a MAC (media access control) address table for establishing a first relationship between a first label value plus a first MAC address and the output ports and a second relationship between a second label value plus a second MAC address and the output ports, the first and second label values forming a pair of companion label values. Switch means monitors the output ports. If the output ports are normal, the switch means switches from any of the input ports a packet containing the first label value plus the first MAC address to one of the output ports according to the first relationship and a packet containing the second label value plus the second MAC address to one of the output ports according to the second relationship. If one of the output ports is abnormal, the switch means rewrites the label value of the packet with the companion label value and switches copies of the packet to all of the output ports in a broadcast mode.

According to a fifth aspect, the present invention provides a method of switching packets to an alternate label-switched path of a communications network when a failure occurs on a working label-switched path. The method comprises the steps of (a) defining first and second label-switched paths between first and second output ports of a local node of the network and input ports of at least one downstream node of the network, (b) establishing a first relationship between a first label value and the first output port and a second relationship between a second label value and the second output port, the first and second label values forming a pair of companion label values, (c) monitoring the first and second output ports, (d) if the first output port is normal, switching a packet containing the first label value from any input port of the local node to the first output port according to the first relationship, and (e) if the first output port is abnormal, rewriting the first label value of the packet with the second label value and switching the packet to the second output port according to the second relationship.

According to a sixth aspect, the present invention provides a method of switching packets to an alternate label-switched path of a communications network when a failure occurs on a working label-switched path, comprising the steps of (a) defining a pair of first label-switched paths between a pair of first output ports of a local node of the network and input ports of downstream nodes of the network and a pair of second label-switched path between a pair of second output ports of the local node and input ports of the downstream nodes, (b) establishing a first relationship between the first label value and the pair of first output ports and a second relationship between the second label value and the pair of second output ports, (c) monitoring the pair of first output ports and the pair of second output ports, (d) responsive to oppositely traveling packets each containing the first label value arriving at any input port of the local node, switching the packets to the pair of first output ports according to the first relationship if both of the first output ports are normal, and (e) if one of the first output ports is abnormal, rewriting the first label value of one of the oppositely traveling packets with the second label value and switching the packet to one of the second output ports according to the second relationship, and (f) rewriting the second label value of the other packet of the oppositely traveling packets with the first label value and switching the other packet to the other of the first output ports according to the first relationship.

According to a seventh aspect, the present invention provides a method of switching packets to an alternate label-switched path of a communications network when a failure occurs on a working label-switched path, comprising the steps of (a) defining first and second label-switched paths between first and second output ports of a local node of the network with at least one downstream node, (b) establishing relationships between the first and second label values and the first and second output ports, (c) monitoring the output ports, (d) if both of the output ports are normal, switching from any of the input ports first and second parallel packets respectively containing first and second label values to the first and second output ports according to the relationships, and (e) if the first output port is abnormal, rewriting the first label value of the first packet with the second label value and switching both of the first and second packets to the second output port according to the relationship between the second label value and the second output port.

According to a further aspect, the present invention provides a method of switching packets to an alternate label-switched path of a communications network when a failure occurs on a working label-switched path, comprising the steps of (a) defining a plurality of label-switched paths between a plurality of output ports and a plurality of downstream nodes, (b) establishing a first relationship between a first label value plus a first MAC address and the plurality of output ports and a second relationship between a second label value plus a second MAC address and the plurality of output ports, wherein the first and second label values form a pair of companion label values, (c) monitoring the output ports, (d) if the output ports are normal, switching from any of the input ports a packet containing one of the first and second label values and one of the first and second MAC addresses to one of the output ports according to one of the first and second relationships, and (f) if one of the output ports is abnormal, rewriting the label value of the packet with the companion label value and switching copies of the packet to all of the output ports in a broadcast mode.

According to a still further aspect, the present invention provides a network node for a label-switched path communications network for establishing a label-switched path defined by a label value contained in a packet, comprising a plurality of input ports, first and second output ports for respectively defining first and second label-switched paths with at least one downstream node, and switch means for monitoring the output ports and switching, from any of the input ports, a packet containing a first label value to the first output port according to a first relationship between the first label value and the first output port if the first output port is normal, rewriting, if the first output port is abnormal, the first label value of the packet with a second label value and switching the packet to the second output port according to a second relationship between the second label value and the second output port, the first and second label values forming a pair of companion label values.

According to a still further aspect, the present invention provides a network node for a label-switched path communications network for establishing a label-switched path defined by a label value contained in a packet, comprising a plurality of input ports, a pair of first output ports for defining a pair of first label-switched paths and a pair of second output ports for defining a pair of second label-switched paths with at least one downstream node, and switch means for monitoring the output ports and (a) if both of the first output ports are normal, switching from any of the input ports oppositely traveling packets each containing the first label value to the pair of first output ports according to a first relationship between the first label value and the pair of first output ports, (b) if one of the first output ports is abnormal, rewriting the first label value of one of the oppositely traveling packets with the second label value and switching said one packet to one of the second output ports according to a second relationship between said second label value and said pair of second output ports, and rewriting the second label value of the other packet of said oppositely traveling packets with the first label value and switching the other packet to the other of the first output ports according to the first relationship.

A still another aspect of the present invention, there is provided a network node for a label-switched path communications network for establishing a label-switched path defined by a label value contained in a packet, comprising a plurality of input ports, a plurality of output ports for defining a plurality of label-switched paths with at least one downstream node, a MAC address table for establishing a first relationship between a first label value plus a first MAC address and said output ports and a second relationship between a second label value plus a second MAC address and said output ports, said first and second label values forming a pair of companion label values, and switch means for monitoring the output ports and (a) if said output ports are normal, switching from any of said input ports a packet containing said first label value plus said first MAC address to one of said output ports according to said first relationship and a packet containing said second label value plus said second MAC address to one of said output ports according to said second relationship, and (b) if one of the output ports is abnormal, rewriting the label value of the packet with the companion label value and switching copies of said packet to all of said output ports in a broadcast mode.

BRIEF DESCRIPTION OF THE DRAWINGS

The present invention will be described in detail further with reference to the following drawings, in which:

FIG. 3 is a block diagram of a representative network node of present invention;

FIG. 4 is an illustration of a line state table;

FIG. 12A is a block diagram of a dual ring label-switched path network in which all nodes of the network are operating under normal conditions by exclusively using the outer ring;

FIG. 12B is a block diagram of the dual ring label-switched path network in which all nodes of the network uses both outer and inner rings in the event of a link failure;

FIG. 15A is a block diagram of a parallel transmission system incorporated in label-switched path network of the present invention for transporting unicast traffic;

FIG. 15B is a block diagram of a parallel transmission system incorporated in the label-switched path network for transporting multicast traffic;

FIG. 18 is an illustration of a modified MAC address table.

DETAILED DESCRIPTION

Figure 1:
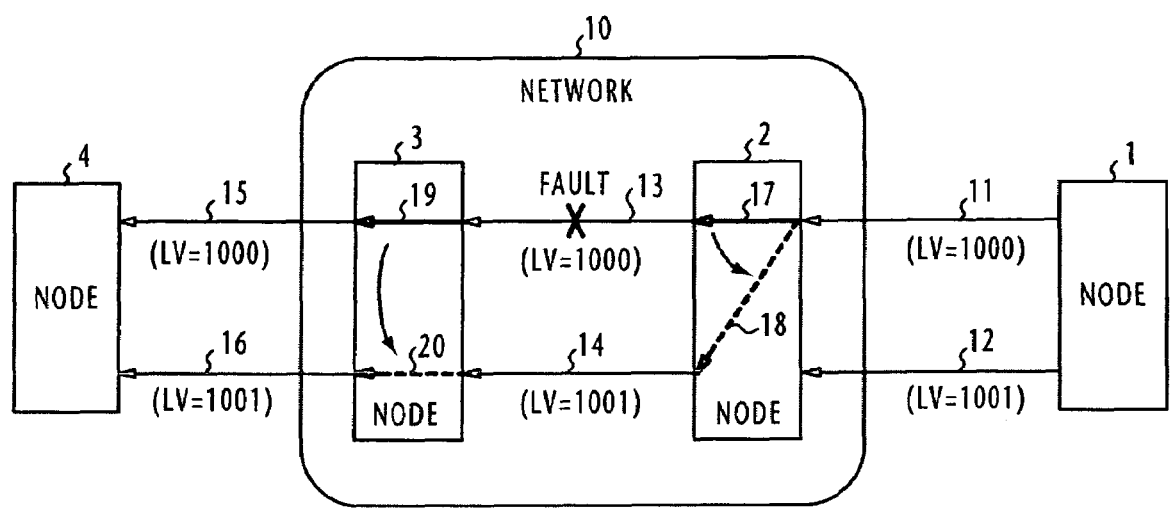
FIG. 1 is a block diagram of an exemplary embodiment of the label-switched path communications network of the present invention.

Referring now to FIG. 1, there is shown an exemplary label-switched path network system of the present invention, which is simplified for the sake of disclosure. The network system comprises a plurality of nodes 1, 2, 3 and 4, of which nodes 1 and 4 are source and sink nodes, respectively, and nodes 2 and 3 are transit nodes that constitute a label-switched path network 10.

Two label-switched parallel paths are defined between the terminal nodes 1 and 4 using label values "1000" and "1001" (in binary notation). The label-switched path identified by label value "1000" is used as a working path and the path identified by "1001" is used as an alternate path in the event of a cable cut or a link failure on the working path.

Transit nodes 2 and 3 have the ability to direct traffic on the working path to the alternate path should the working path fail. If a failure, as marked X, occurs on the working path, the node 2 reroutes the traffic to the alternate path by switching the label value "1000" to the label value "1001". The working and alternate paths are paired in a companion relationship so that one of the paired paths is used for a working path the other is reserved for an alternate route of the working path and protection switching is performed by altering the label value of the working path to the label value of its companion path. More specifically, the nodes 1 and 2 are connected by a pair of links 11 and 12, the nodes 2 and 3 being connected by a pair of links 13 and 14, and the nodes 3 and 4 by a pair of links 15 and 16.

Figure 2:
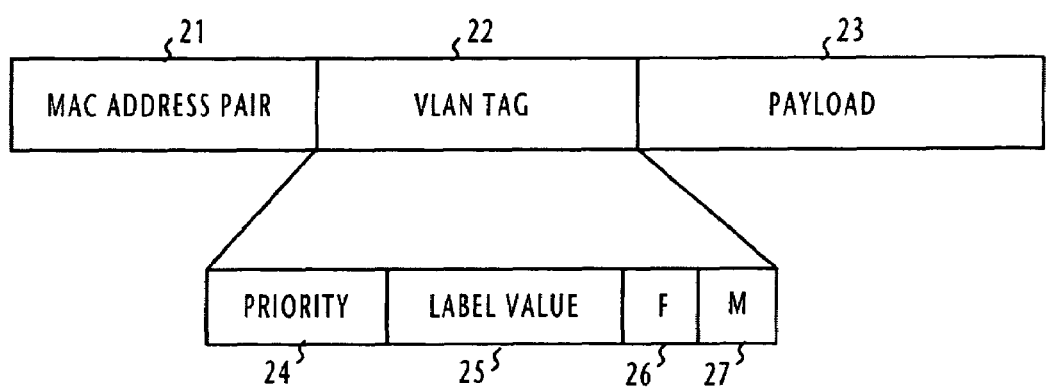
FIG. 2 is an illustration of the data structure of a packet used in the present invention.

The traffic is sent in a packet of the data structure shown in FIG. 2. The packet is comprised of a MAC address field 21 and a VLAN (virtual LAN) tag field 22 followed by a payload field 23. VLAN tag field 22 includes a priority field 24, a label value field 25, a flag (F) field 26 and a flag (M) field 27. Flag (F) field 26 indicates whether the traffic is on a working path (F=0) or on an alternate path (F=1). Flag (M) field 27 indicates whether the traffic is unicast (M=0) or multicast (M=1).

As shown in FIG. 3, each of the transit nodes 2 and 3 comprises a switch 30 having a plurality of label processors 41, 42, 43, 44 on its input ports 31 through 34 and a plurality of interfaces 45, 46, 47 and 48 on its output ports 35 through 38. Switch 30 may of the type such as the Ethernet switch capable of switching based on VLAN tag value or a switch capable of switching using a MAC-layer address. Switch 30 is connected to a controller 39 that controls the switch 30 according to a forwarding table 40. Forwarding table 40 correlates the output ports "35", "36", "37" and "38" with label values "1000", "1001", "0110" and "0111", respectively. Output ports 35 and 38 are respectively associated with working and alternate paths identified by label values "1000" and "1001" which form a pair of companion label-switched paths. Likewise, the output ports 36 and 37 are respectively associated with working and alternate paths identified by label values "0110" and "0111" which form a pair of companion label-switched paths.

Interfaces 45 through 48 monitor their associated output ports for detecting their line states and informs the controller 39 of normal/failure (N/F) conditions. The information of the line states is then supplied from the controller 39 to each of the label processors 41~44. Each label processor is accessible to a line state table 50, shown in FIG. 4, in which the label values "1000", "1001", "0110" and "0111" are mapped to the link states of their associated output ports.

FIG. 4 shows one example of local paths established in the switch 30 according to the label values listed in the forwarding table 40. Packets bearing the label value "0110", for example, are all switched to the output port 36, regardless of which input port the packets have arrived. Therefore, in the present invention, each output port is uniquely identified by a label value contained in a packet and the label value is used consistently across the network. Therefore, the packet is routed through the switch 30 according to the forwarding table 40 to an output port specified by the label value of the packet, regardless of the input port on which the packet has arrived. In contrast, MPLS (Multi-protocol Label Switching) technology and the ATM (Asynchronous Transfer Mode) technology differ in that they direct incoming packets to an output port which is uniquely determined on a per-input port basis. Therefore, different label values can be used in a number of links within the MPLS and ATM networks on a link-by-link basis.

In the event of a failure on the output port 35, for example, the controller 39 looks up the forwarding table 40 to obtain the corresponding label value "1000" and stores it into the line state table 50 so that a failure indication is given in the line state field corresponding to the label value "1000". If a packet of label value "1000" arrives on the input port 32, for example, the associated label processor 42 checks to see if the corresponding output port (line) 35 is normal or faulty. If it is normal, the label processor forwards the packet to the switch 30 without rewriting its label value. As a result, the packet is self-routed through the switch 30 to the output port 35 of the working path according to the label value "1000".

Figure 5:
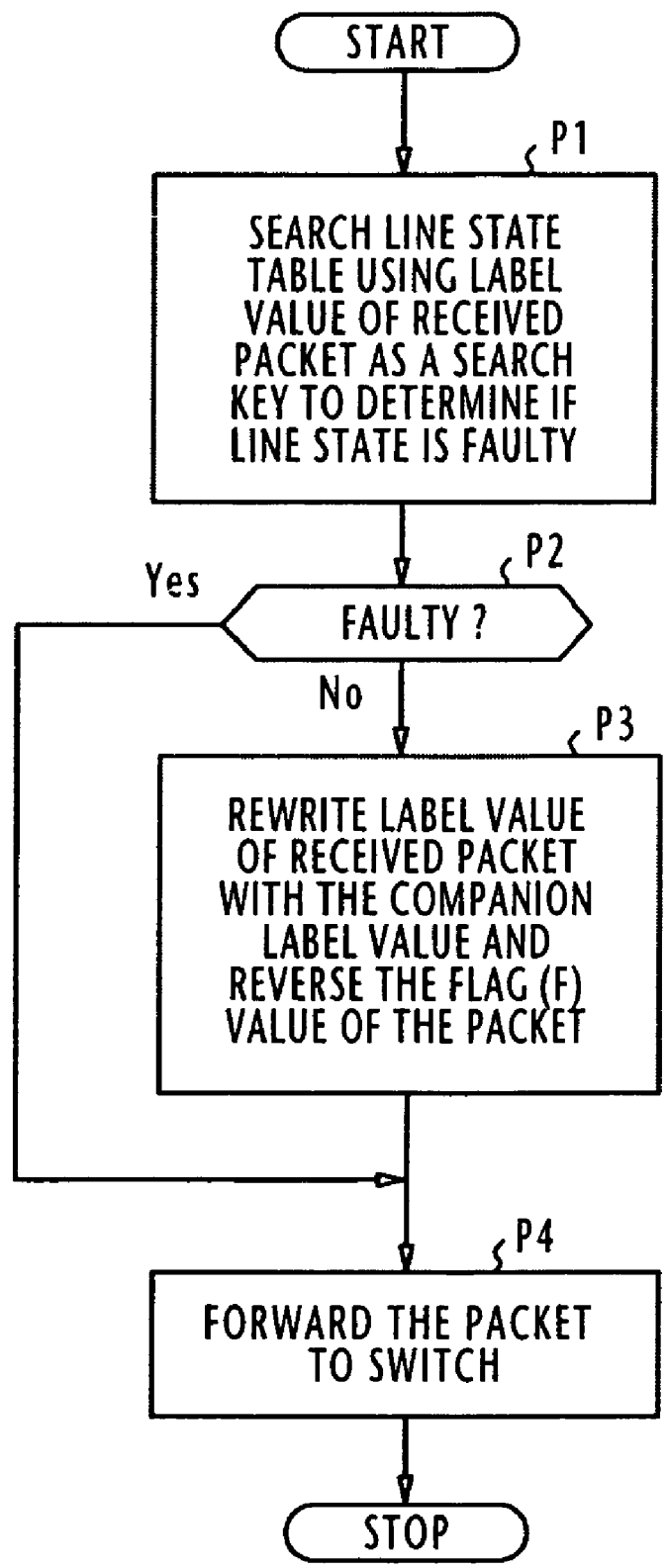
FIG. 5 is a flowchart of the operation of each network node of FIG. 1.

The operation of each label processor proceeds according to the flowchart of FIG. 5. When the label processor receives a packet, the label processor makes a search, at step P1, through the line state table using the label value of the received packet as a search key and determines if the line state of the corresponding output port is faulty. If the corresponding output port is faulty, the decision at step P2 is affirmative and flow proceeds to step P3 to rewrite the label value of the received packet with the companion label value and the packet is forwarded to the switch (P4). If the corresponding output port is normal, the decision at step P2 is negative and flow proceeds to step P4 to forward the packet to the switch.

Returning to FIG. 1, when the source node 1 transmits a packet with a label value "1000" to the transit node 2, the node 2 proceeds through steps P1, P2 to step P4, so that the packet is forwarded intact from the input port of the link 11 into the switch and routed through a local path 17 to the output port associated with the link 13 and transmitted to the transit node 3. In like manner, the packet is switched in the node 3 through a path 19 to the output port of the link 15 and transmitted to the sink node 4. As a result, a working label-switch path is formed across the network 10 between the source node 1 and the sink node 4 with the links 11, 13, 15 and the local paths 17, 19.

If the link 13 fails, the node 2 updates the line state table 50 by indicating that the link 13 is abnormal. In response to a subsequent packet from the source node 1, the transit node 2 proceeds through steps P1, P2, P3 to step P4, whereby the label value "1000" of the packet is rewritten with its companion label value "1001" (i.e., the opposite label value of the working-alternate pair to the label value of the packet) and reverses its F-flag value to "1" and forwards the packet so that the packet is routed through a path 18, instead of path 17, to the output port of the link 14.

Node 3 uses the label value "1001" to search the line state table 50 and determines whether the link 16 identified by the label value "1001" is normal. If this is the case, the decision at step P2 is negative and flow proceeds to step P4 to forward the packet to its switch so that the packet is routed through a local path 20, instead of path 19, to the output link 16. As a result, an alternate path identified with the label value "1001" is formed with the links 11, 14, 16 and the local paths 18, 20 between the source node 1 and the sink node 4.

Figure 6:
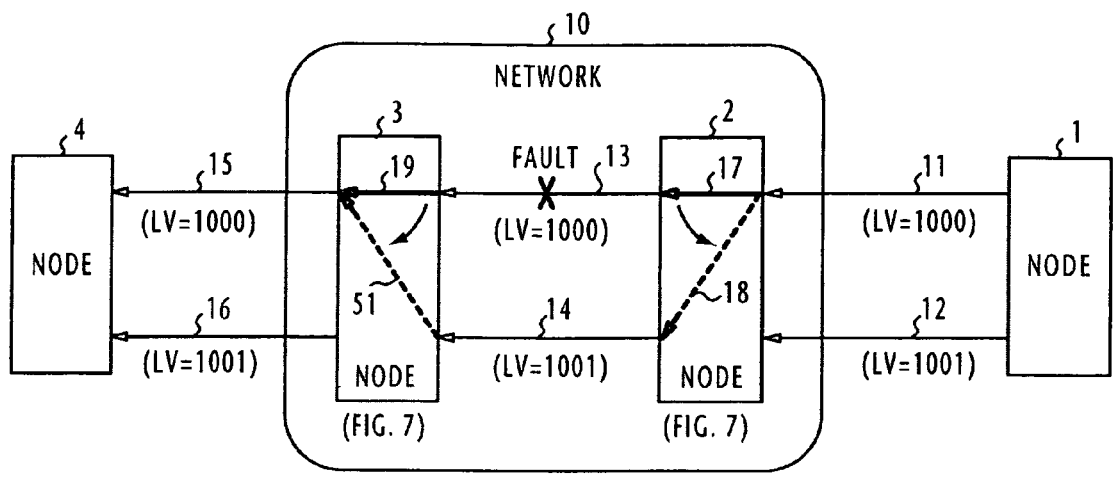
FIG. 6 is a block diagram of a modified embodiment of the present invention.

A modified embodiment of the present invention is shown in FIG. 6 in which the transit node 3 rewrites the companion label value "1001" of the packet from the upstream transit node 2 with the working label value "1000". Thus, the packet is routed through a path 51, instead of working path 19, to the output port of the link 15. With the label value of the alternate path being reverted to the label value of the working path, the node or nodes downstream of the node 3 do not have the trouble of changing the label value of incoming packets after the occurrence of an upstream link failure. In this way, the effect that may possibly arise as a result of the link failure can be localized in a limited area of the network, thus preventing a local failure from spreading across the network.

Figure 7:
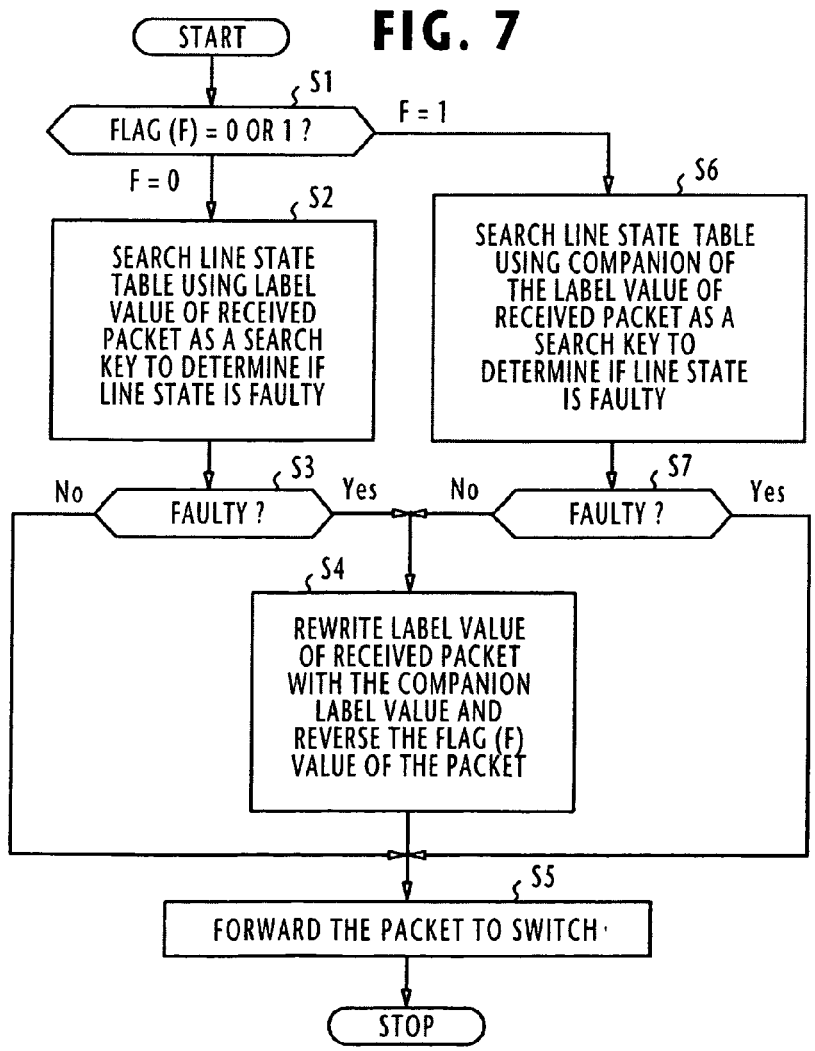
FIG. 7 is a flowchart of the operation of the node of FIG. 6.

FIG. 7 is a flowchart of the operation of each transit node of FIG. 6.

In response to a packet from an upstream node, each transit node examines the flag field of its VLAN tag field (step S1). If F=0, the label processor proceeds to step S2 to make a search through the line state table 50 using the label value of the received packet as a search key and checks to see if the corresponding output port is faulty. If the corresponding output port is abnormal, the decision at step S3 is affirmative and the label processor rewrites the label value of the packet with its companion label value and reverses its flag F to "1" (step S4) and forwards the packet to the switch 30 (step S5).

When a downstream node receives a packet from an upstream node with a label value "1001" and F=1 (step S1), flow proceeds to step S6 to make a search through the line state table 50 using the companion label value of the packet. If the line state of the output link identified by the label value of the packet is indicated "normal" (step S7), the decision is negative at step S7 and flow proceeds to step S4 to rewrite the label value of the received packet with the companion label value of the packet and forward the packet to the switch (step S5). If the decision at step S7 is affirmative (step S7), flow proceeds to step S5 to forward the packet intact to the switch (step S5).

Returning to FIG. 6, when a transit node 2 receives a packet with the first label value "1001" and F=1 from a source node 1, the node proceeds through steps S1, S2, S3 to step S5 if the link 13 is normal, so that the packet is switched through local path 17. If the link 13 fails, the node 2 proceeds through steps S1, S2, S3, S4 to step S5, whereby the first label value "1000" of the packet is rewritten with the second label value "1001" and the flag F is reversed to "1" and transmitted through local path 18 to the link 14.

In the downstream transit node 3 receives the packet from the node 2 (step S1), flow proceeds to step S6 to make a search through the line state table 50 using the companion label value of the packet, which in this case is "1000". If the line state of the output link identified by the label value "1000" is indicated "normal", the decision at step S7 is negative and flow proceeds to step S4 to rewrite the label value of the received packet ("1001") with the companion label value ("1000"). Thus if the link 15 is found "normal" in the line state table 50, the decision at step S7a is negative and the packet is re-routed via the local path 51 to the link 15. If the link 15 is found "faulty" in the line state table 50, the decision at step S7 is affirmative and the packet is routed to the link 16.

Figure 8:
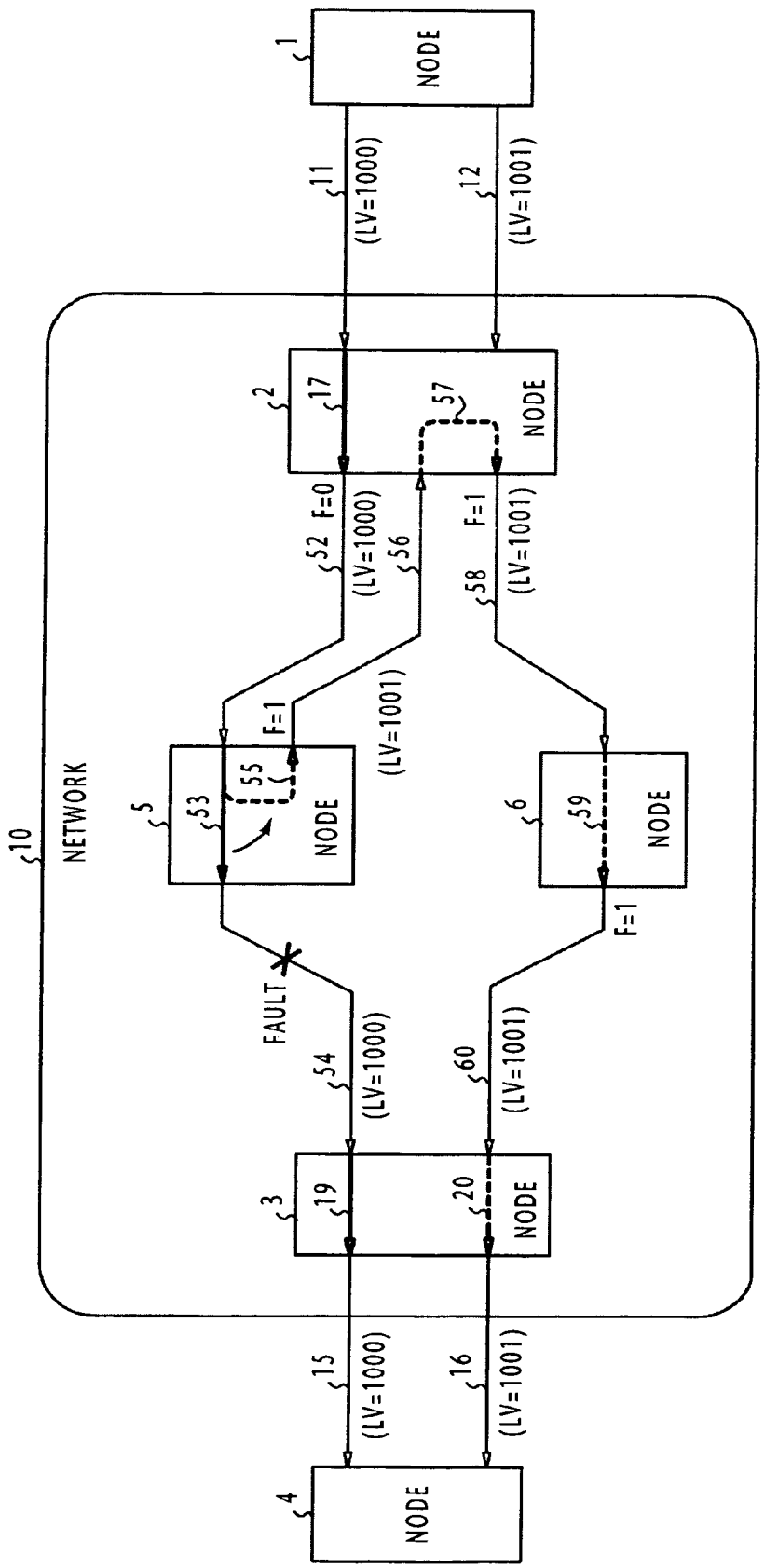
FIG. 8 is a block diagram of a modified embodiment in which a loopback link is used as an alternate label-switched path.

A modified label-switched path network is shown in FIG. 8. In this modification, the network 10 includes additional transit nodes 5 and 6, with the transit node 5 being connected in the working path between the transit nodes 2 and 3 which is identified by the label value "1000" and formed with links 52 and 54. Transit node 6 is connected in the alternate path, which is identified by the companion label value "1001" and formed with links 58 and 60. Each of the transit nodes operates according to the flowchart of FIG. 9, so that in the intermediate node 5 packets are normally routed through a local path 53. From the transit node 5 to the node 2 an alternate link 56 is provided. As illustrated, the link 56 extends from an output port of the node 5 and terminates at an input port of the node 2 to form a "loopback path".

If a failure has occurred in the link 54 when the node 5 receives a packet with a label value "1000" (with F=0), it makes an affirmative decision at step S3 and rewrites the label value of the packet with the companion label value "1001" and reverses its F-flag value to "1" (step S4) and forwards the packet to the switch (step S5). The packet thus wraps around and passes through the link 56 to the node 2.

In response to the loopback packet with the label value "1001", the node 2 proceeds through step S1 to step S8 to determine if the packet is a loopback packet. Since the decision is affirmative, flow proceeds to step S9 to search the line state table 50 using the label value of the packet to determine if the output link identified by the label value "1001" is faulty (step S10). If not, flow proceeds to step S5 to forward the packet to the switch. As a result, the packet is routed through a path 57 to the link 58. If the node 2 makes an affirmative decision at step S10, flow proceeds to the end of the routine.

On receiving this packet, the node 6 proceeds through steps S1 and S8 to step S11 to determine if the link identified by the label value "1001" is faulty (step S12). If not, flow proceeds to step S5 to forward the packet to the switch. As a result, the packet is routed through a path 59 to the link 60. On receiving this packet, the node 3 proceeds through steps S1, S8, S11 and S12 to step S5 and forwards the packet so that it follows the path 20 and link 16 to the sink node 4.

Subsequent packets from the source node 1 follow the same path so that they are wrapped around the node 5 to the node 2 and re-routed to the sink node 4 through the alternate path identified by the label value "1001".

Figure 10:
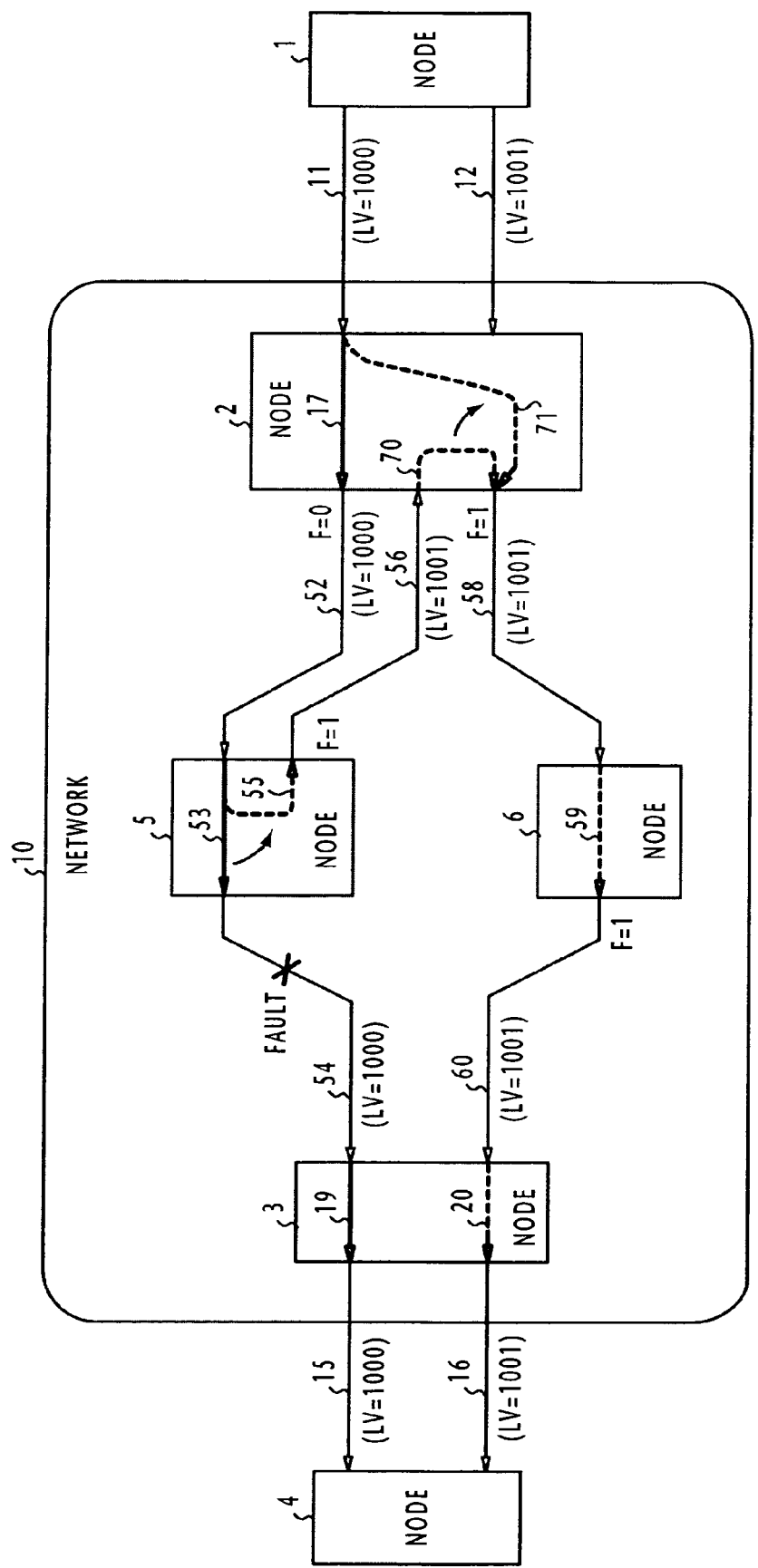
FIG. 10 is a block diagram of a variation of the embodiment of FIG. 8 in which the loopback link is used temporarily between nodes for establishing an alternate label-switched path.

The operation of the network 10 of FIG. 8 can be modified as shown in FIG. 10. In this modification, when the node 2 receives a loopback packet from the node 5, it updates the line state table 50 by setting a faulty indication in the line state entry of the output link 52 identified by the companion label value (i.e., "1001") of the label value (i.e., "1000") of the packet, while allowing the packet to be routed to the link 58. As a result, subsequent packets from the source node 1 are rerouted to the link 58.

Figure 9:
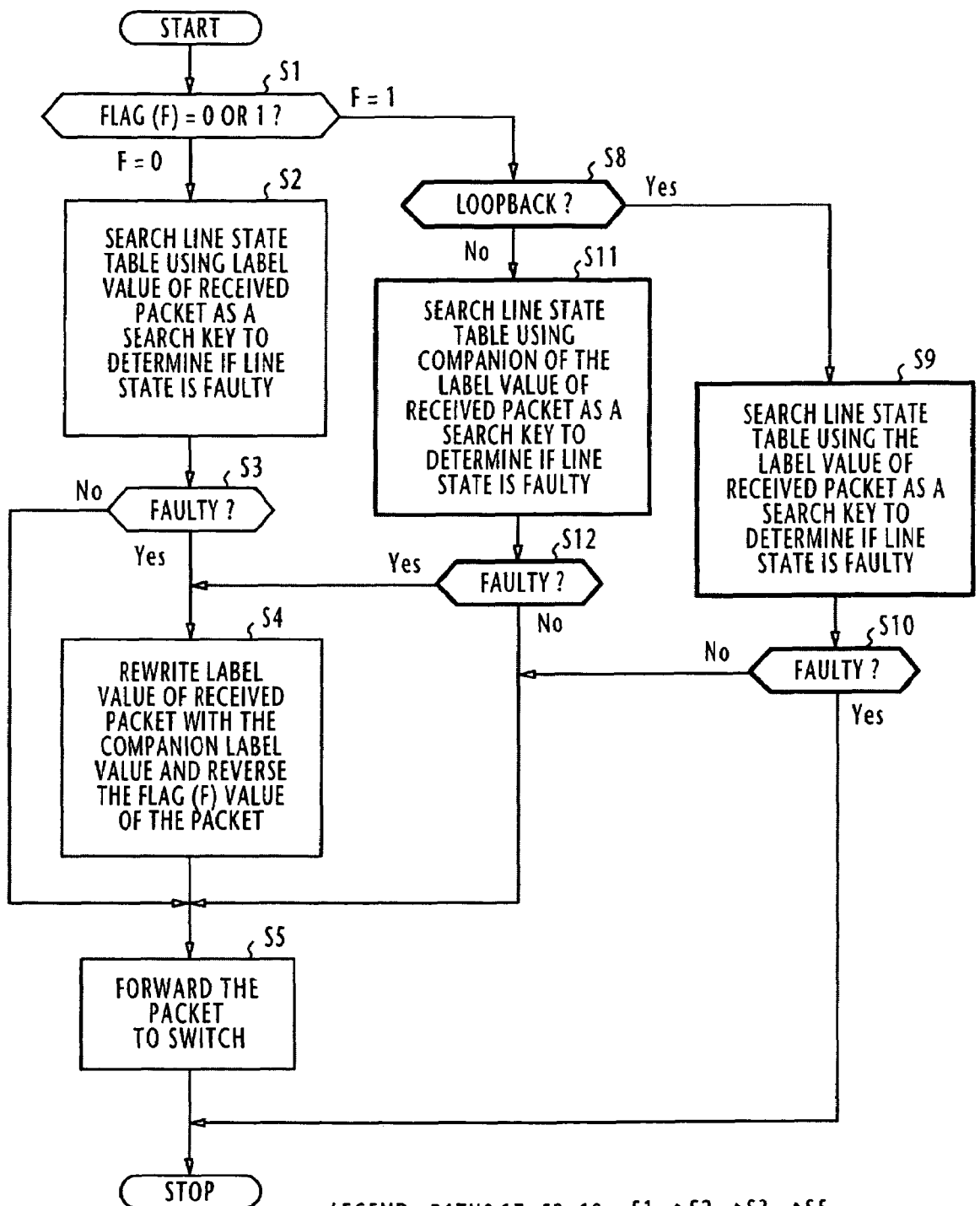
FIG. 9 is a flowchart of the operation of each node of FIG. 8.
Figure 11:
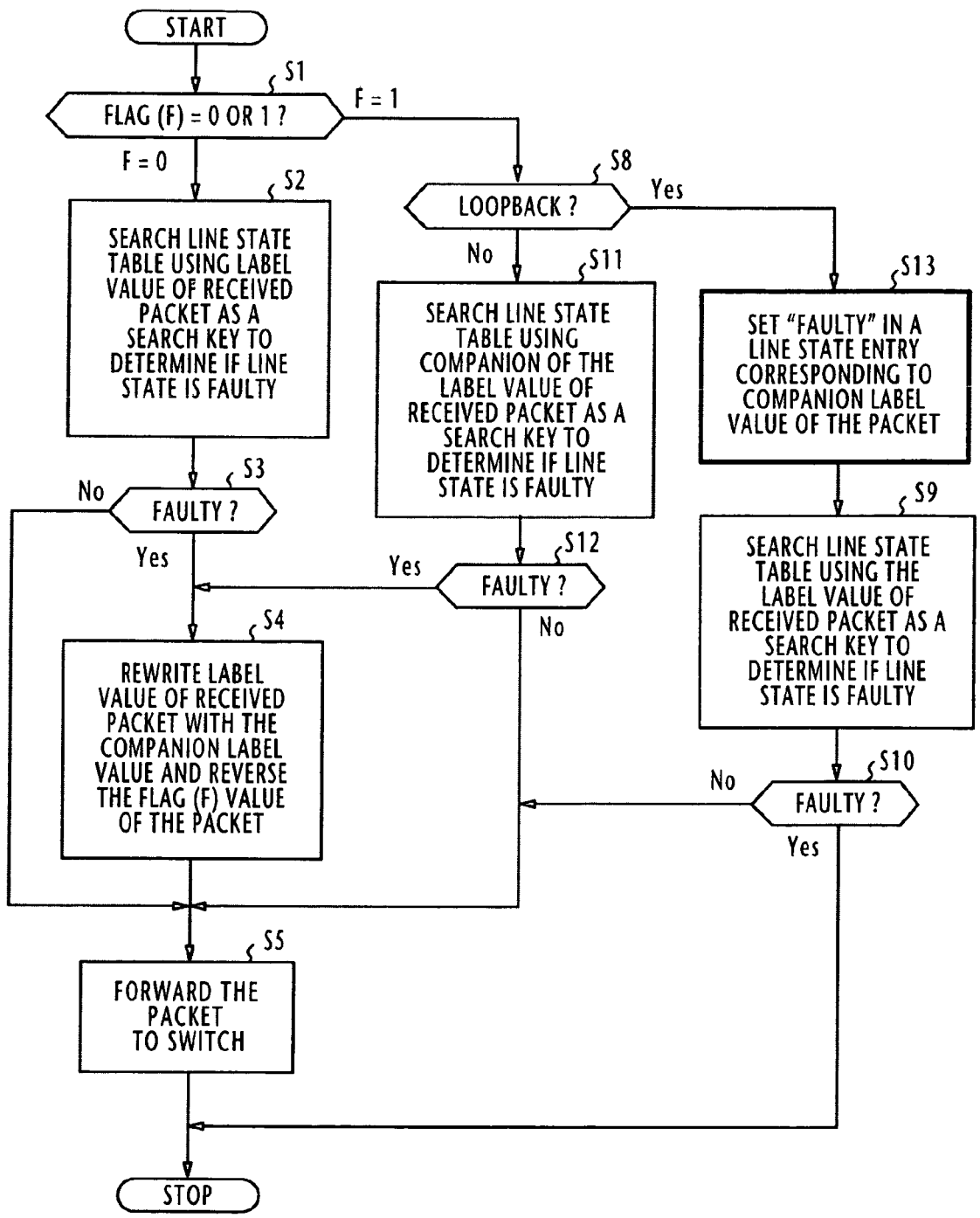
FIG. 11 is a flowchart of the operation of each node of FIG. 10.

More specifically, the flowchart of FIG. 9 is modified to include step S14 between steps S8 and S9 as shown in FIG. 11 to set a "faulty" indication in an entry of the line state table 50, which corresponds to the output port identified by the companion label value of a received loopback packet Returning to FIG. 10, when the node 2 receives a loopback packet with label value "1001" and F=1 from the node 5 on the link 56, flow proceeds through steps S1 and S8 to step S13 and set faulty indication in the line state entry corresponding to the output port identified by "1000" and then proceeds to steps S9 and S10 to check the line state of the alternate link 58 for failure or normal, as described previously. If the line state is normal, the loopback packet is routed through a path 61 to the link 58.

When the node 2 subsequently receives a packet with label value "1000" and F=0 from the node 1, flow proceeds through step S1 to steps S2, S3 to make a search through the line state table 50, previously updated at step S14, using the label value "1000" as a search key. Node 2 determines that the link 52 has failed and rewrites the label value with the companion value "1001" and reverses the flag F to "1" (step S4) and forwards the packet (step S5). The forwarded packet finds a path 62 to the output link 58 and propagates to the node 6. All subsequent packets from the node 1 follow the same path. Nodes 6 and 3 execute steps S1, S8, S11, S12 and S5 in the same manner as described with reference to the flowchart of FIG. 9.

If it is desired to localize the need to alter the label value, the node 3 may be configured to reverse the label value of a packet received from an upstream node over an alternate link.

The present invention can be used advantageously in a dual ring network as shown in FIGS. 12A and 12B. The dual ring network is comprised of nodes 71, 72, 73, 74 and 75, which are interconnected by links to form a working path 76 and an alternate path 77. Signals are transmitted clockwise in the working path 76 and counter-clockwise in the alternate path 77. Node 71 performs switching of the signals of the ring nodes with an external node via input and output ports 78 and 79.

Figure 13:
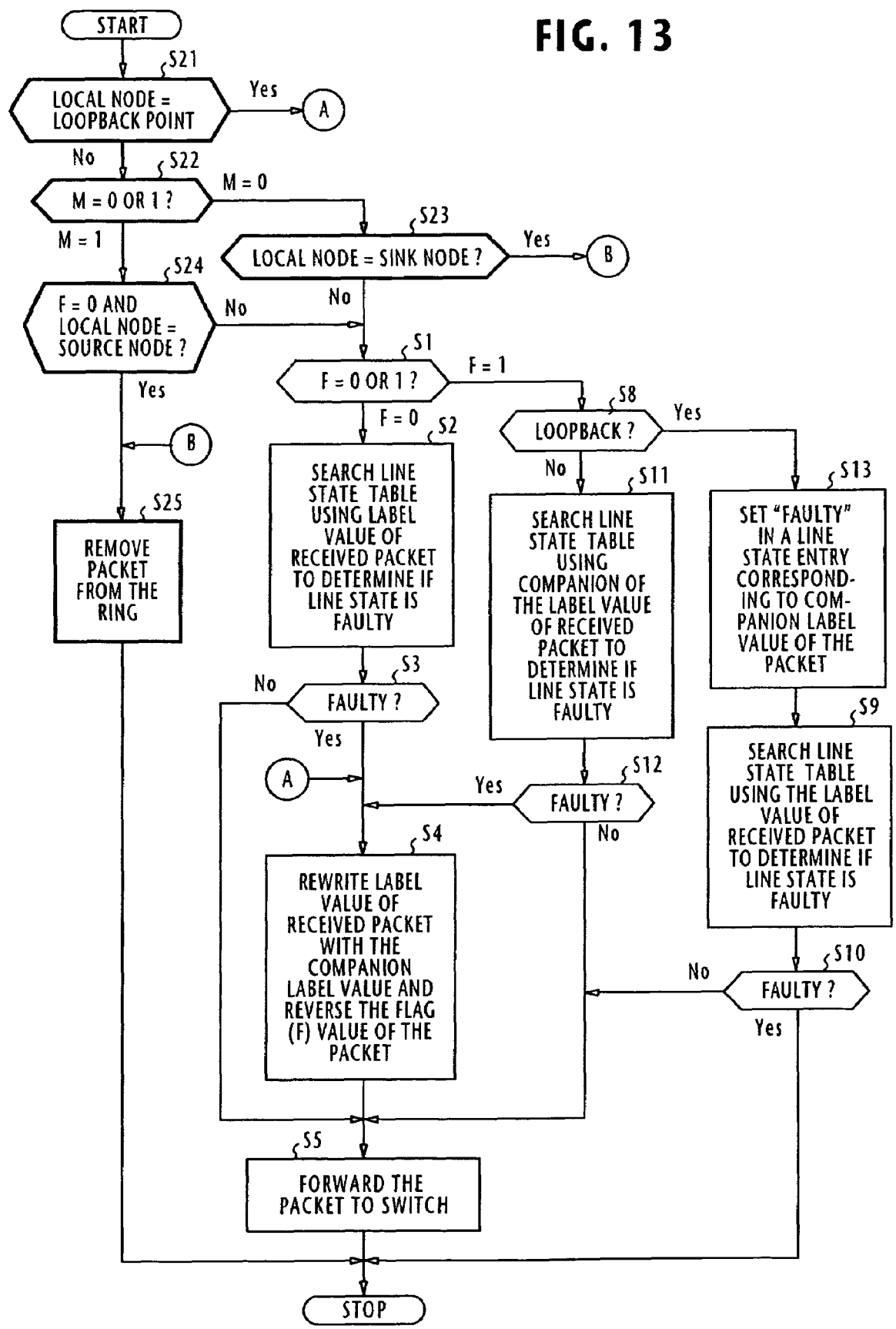
FIG. 13 is a flowchart of the operation of each node of the dual ring network of FIGS. 12A and 12B.

Each node of the dual-ring network operates according to the flowchart of FIG. 13 when a packet is received from the network.

The operation of each node begins with step S21 when the local node receives a packet from the ring network. The local node determines whether or not it is a loopback point at which it has detected a link failure. If not, flow proceeds to step S22 to examine the received packet and determines if flag M=0 or 1. If M=0, the packet is unicast traffic and flow proceeds to step S23 to check to see if the local node is the destination of the packet If so, flow proceeds to step S26 to remove the packet from the network. If the local node is other than the destination of the received packet, flow proceeds from step S23 to step S1 to check to see if F=0 or 1. If F=0, flow navigates through steps S2 and S3 to step S5 to forward the packet to the switch, in the same manner as described previously, if the line state table indicates that the output port corresponding to the label value of the packet is normal. If it is determined that the corresponding output port is faulty, step S4 is performed to rewrite the label value of the packet with the companion label value and reverse the flag F of the packet and the packet is forwarded (step S5).

If F=1 (step S1), flow proceeds to step S8 to determine if the received packet is a unicast packet which the local node has transmitted and which is wrapped round a loopback point and sent back to the source node. If the decision at step S8 is affirmative, this indicates that the packet is still not received by the destination and traveling a longer distance to the destination than would otherwise be taken if the packet were transmitted in the opposite direction. In order to enable subsequent unicast packets from the local node to travel a shorter distance to the destination, the local node proceeds to step S13 to set the "faulty" indication in the line-state table entry of the output port that corresponds to the packet's companion label value. At step S9, the local node determines if the line state of the output port corresponding to the packet's label value indicates "faulty" (step S10). If not, flow proceeds to step S5 to forward the packet. If the decision at step S8 is negative, the line state table is checked with the companion label value of the packet to determine if the corresponding output port is faulty. If not, the packet is forwarded (step S5). If the decision is affirmative at step S12, the local node executes step 54 so that the label value of the packet is rewritten with its companion label value and the flag F is reversed before transmitting the packet at step S5.

If M=1 at step S22, the received packet is multicast traffic and flow proceeds to step S24 to check to see if F=0 and the local node is the source node of the packet. If the local node is the source node of the received multicast packet, the multicast packet has made a round trip on the ring network and flow proceeds to step S25 to remove the packet from the ring. If the decision is negative at step S24, flow proceeds to step S1.

If a link failure has occurred in a location close to the local node, the local node is a loopback point. In this case, the decision at step S21 is affirmative and flow proceeds to step S4 to rewrite the label value of the received packet with its companion label value and reverses the flag F value of the packet and then forwards the packet (step S5).

Therefore, under normal condition, a packet, either unicast or multicast, sent from any node of the dual-ring network travels in clockwise direction as indicated by a thick broken line. In this case, each node executes steps S21, S22, S23, S1, S2, S3 and S5 in sequence in that order, as shown in FIG. 12A, and the packet will travel through local paths 81, 82, 83 and 84 of the clockwise ring path 75 established in the nodes 71, 72, 73 and 74, respectively.

If a failure occurs on links 85 and 86 between nodes 72 and 73 as indicated in FIG. 12B, the node 72 makes an affirmative decision at step S3 when it receives a packet (either unicast or multicast) and rewrites the label value ("1000") of the packet with its companion label value ("1001") and sets the flag (F) field of the packet to "1" at step S4 and forwards the packet (step S5). As a result, the packet received at the node 72 on the clockwise ring path 75 wraps around a local path 92 to the counter-clockwise ring 76 and is transmitted with label value "1001" and F=1. As this packet travels along the counter-clockwise ring 76, each of the nodes 71 and 74 executes steps S21, S22, S23 (or S24), S1, S8, S11, S12 to S5 in sequence. When this packet arrives at the node 73 on the counter-clockwise ring path 76, the node 73 makes an affirmative decision at step S21 since it is the other loopback point of the failure and proceeds to step S4 to rewrite the label and flag values of the packet to "1000" and F=0 and forwards the packet so that the packet is switched on a local path 93 in the node 73 and travels along the clockwise ring path 75 through nodes 74 and 71 to the node 72.

If the node 72 receives a packet with label value "1000" and F=0 on the clockwise ring 75 after it has established itself as a loopback node, flow proceeds from step S21 to step S4 to rewrite the label value of the packet with its companion label value and reverse the value of its flag F and forward the packet. The packet thus wraps around the local path 92 to the counter-clockwise ring 76.

If a unicast packet (M=0, F=0) is sent from the node 71 to the node 74 when all traffic is exclusively carried on the working (clockwise) ring 75 when there is no failure in the network as shown in FIG. 12A, the source node 71 executes steps S21, S22, S23, S1, S2, and S3 in sequence and exits to step S5. The packet is routed through a local path 87 to the ring path 75 and travels clockwise through nodes 72 and 74 to the sink node 74. In response, the node 74 executes steps S21, S22 and proceeds to step S23 to determine that the packet is addressed to the local node and proceeds to step S25 to remove the packet from the outer ring 75 through a local path 88.

If a unicast packet (M=0, F=0) is sent from the node 71 to the node 74 after a failure has occurred between nodes 72 and 73 and all traffic is carried on the working ring 75 as shown in FIG. 12B, the source node 71 executes steps S21, S22, S23, S1, S3, and S5 in sequence in that order. The packet is rewritten as "1001" and F=1 by the loopback node 72 and sent back to the source node 71. As a result, the node 71 navigates through steps S21, S23, S1, and S8 and exits to S13 to record the faulty state of the output port corresponding to the companion value "1000" of the packet's label "1001" and navigates through steps S9 and S10 and exits to step S5. Therefore, the packet is routed through a path indicated by numerals 95A and 96. When the source node 71 receives a subsequent unicast packet, flow proceeds through steps S21, S22, S23, S1 to step S2. Since the line state of the output port identified by label value "1000" is faulty, the decision at step S3 is affirmative and the label value of this packet is rewritten with the companion value "1001" and flag bit F is set to "1" (step S4) and the packet is then forwarded (step S5) to the node 74. As a result, the packet is routed along a shorter path indicated by numerals 95B and 96.

If traffic is also carried on the inner ring 76 when a failure occurs on the outer ring 75, the traffic on the outer ring is diverted to the inner ring and multiplexed with the inner-ring traffic onto the same transmission medium. When this occurs, the priority field 24 of the outer-ring packets can be used to advantage for the inner ring by lowering the priority value of the diverted outer-ring traffic (from binary "100" to binary "101", for example). Each node on the inner ring treats the multiplexed traffic according to the different priority levels. As a result, the inner ring can be protected from possible adverse effects which might be caused by the multiplexing of traffic.

While mention has been made of embodiments in which the label value 1001 is also used to identify the working path and flags F=0 and F=1 are used to identify the working and alternate paths, the flag F can be dispensed with if the label values 1000 and 1001 are exclusively used to identify working and alternate paths, respectively.

Figure 14:
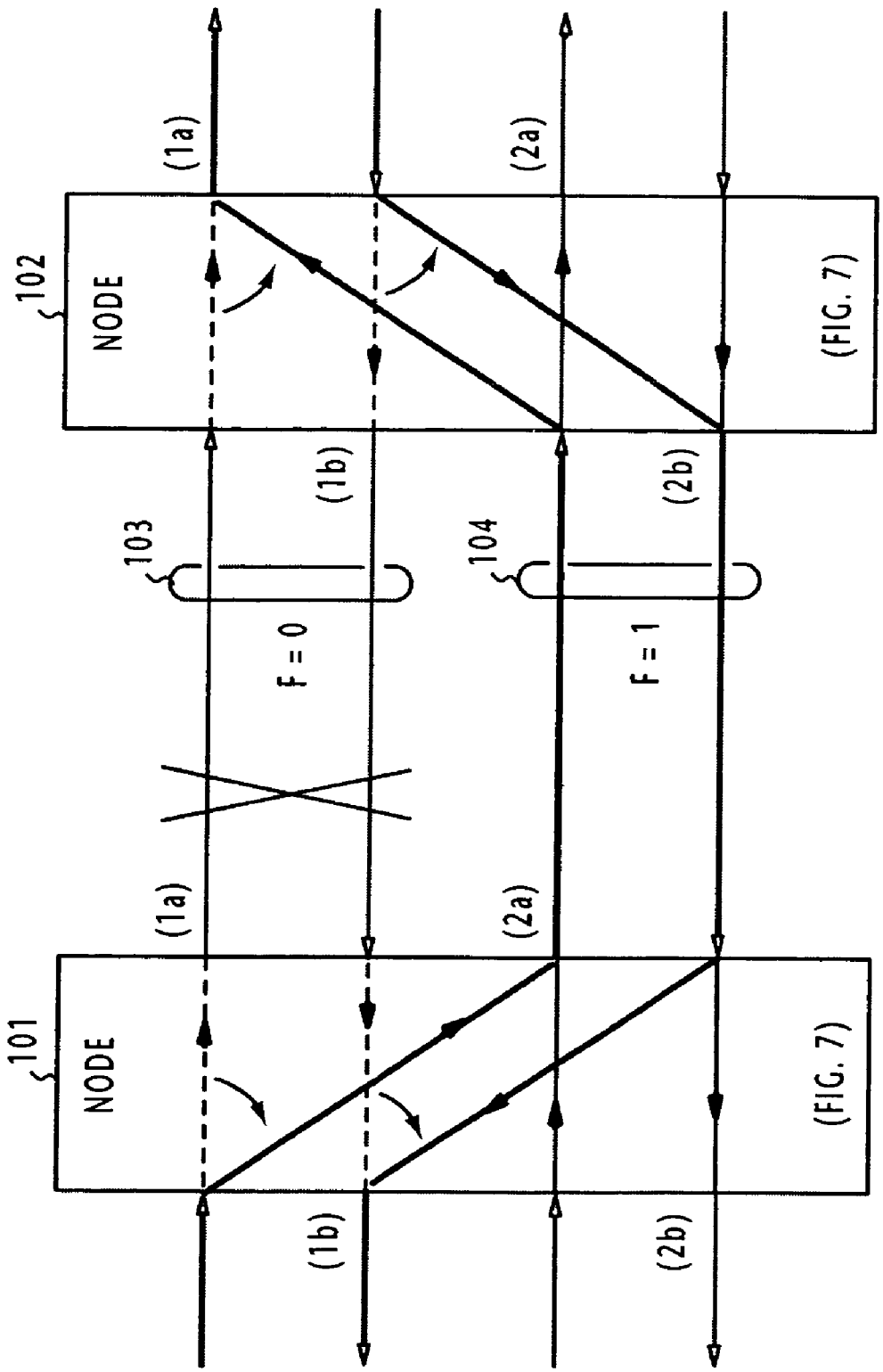
FIG. 14 is a block diagram of a bidirectional transmission system incorporated in the label-switched path network of the present invention.

The present invention can also be used to advantage for protection switching bi-directional transmission paths. As shown in FIG. 14, nodes 101 and 102 are interconnected by a first bi-directional path 103 and a second bidirectional path 104. Each of the nodes 101 and 102 operates according to the flowchart of FIG. 7. Under normal conditions, packets with F=0 are transmitted between the nodes 101 are 102 over the first bi-directional path 103.

When the first bi-directional path 103 fails, the node 101 rewrites the label value of a packet to the node 102 with its companion label value and sets the flag-F value to "1" and forwards the packet. This packet is routed through the second bi-directional path 104 to the node 102. In response, the node 2 restores the label value of the packet to its companion (original) label value and resets its flag value to "0". As a result, the packet is diverted in the node 102 to the first bidirectional path 103.

In a similar manner, the node 102 rewrites the label value of a packet to the node 101 with its companion label value and sets the flag-F value to "1" and forwards the packet. This packet is routed through the second bidirectional path 104 to the node 101. In response, the node 1 restores the label value of the packet to its companion (original) label value and resets its flag value to "0". As a result, the packet is diverted in the node 101 to the first bidirectional path 103.

The operation of the bidirectional transmission system of FIG. 14 is summarized as follows.

If both of first output ports (1a, 1b) of node 101 are normal, oppositely traveling packets each containing label value "1000" are switched to first output ports (1a, 1b) according to a first relationship mapped between the label value "1000" and first output ports (1a, 1b). These packets are switched in the same manner in the node 102. If the first output port (1a) is abnormal, the first label value "1000" of one of the oppositely traveling packets is rewritten with the second label value "1001" and switched to the second output port (2a) according to a second relationship mapped between the second label value "1001" and the second output ports (2a, 2b), and the second label value "1001" of the other packet is rewritten with the first label value "1000" and switched to the first output port (1b) according to the first relationship. In the node 102, the second label value "1001" of one of the oppositely traveling packets is rewritten with the first label value "1000" and switched to the first output port (1a) according to the first relationship, and the first label value "1000" of the other packet is rewritten with the second label value "1001" and switched to the second output port (2b) according to the second relationship.

Load-balanced transmission can be implemented by using a pair of parallel unidirectional paths in unicast and multicast modes. FIG. 15A shows a unicast-mode, load-balanced parallel transmission system. A source node 201 is connected to a sink node 204 via transit nodes 202 and 203 over first and second unidirectional paths 211 and 212. FIG. 15B shows a multicast-mode, load-balanced parallel transmission system.

The label value of the transmission system comprises a node identifier. A six-bit node identifier ("0101XY") is used as an example. The least significant bit (Y) indicates whether the system is in a unicast mode (Y=0) or a multicast mode (Y=1) and the fifth bit (X) identifies the transmission paths 211 (X=0) and 212 (X=1).

The label values of the unicast packets transmitted over the paths 211 and 212 are represented by a sink-specific node identifier (010100) and a sink-specific node identifier (010110), respectively.

If the path 211 fails when the system is operating in a unicast mode as shown in FIG. 15A, the node 202 rewrites the label value ("010100") of the packet received on the path 211 from the node 201 with its companion label value ("010110") and forwards the packet, so that the packet is diverted to the path 212. On receiving this packet, the node 203 restores the label value of the packet to its companion value "010100" and forwards the packet so that the packet is routed to the path 211.

On the other hand, the label values of the multicast packets carried on the paths 211 and 212 are represented by a source-specific node identifier (010101) and a source-specific node identifier (010111), respectively.

If the path 211 fails when the system is operating in a multicast mode as shown in FIG. 15B, the node 202 rewrites the label value ("010101") of the packet received on the path 211 from the node 201 with its companion label value ("010111") and forwards the packet, so that the packet is diverted to the path 212. On receiving this packet, the node 203 restores the label value of the packet to its companion value "010101" and forwards the packet so that the packet is routed to the path 211.

The operation of the parallel transmission system of FIGS. 15A, 15B is summarized as follow.

When, both of the output ports of the node 202 are normal, first and second parallel packets respectively containing label values "1000" and "1001" are switched from its input ports of node 202 to the respective output ports according to relationships between the label values "1000" and "1001" and the output ports (paths) 211 and 212. These packets, are likewise switched in the node 203 to the respective output ports.

If the first output port 211 is abnormal, the first label value "1000" of the first packet is rewritten with the second label value "1001" and both of the packets are switched to the second output port 212 according to the relationship between said second label value and said second output port. In the node 203, the second label value "1001" of the first packet is rewritten with the first label value "1000" and switched to its first output port.

In the embodiments described above, a pair of paths is used for transmission of packets. More than two paths can also be used. If a set of three paths are used for working and alternate routes, label values "0001", "0010" and "0011", for example, may be assigned respectively to the three paths. When packets are diverted to an alternate path, whole bits of the label value for the working path are overwritten with the whole bits of the label value of an alternate path, instead of reversing the least significant bit.

As described, the first and second label values are multi-bit codes. Advantageously, every bit of each code is complementary to the corresponding bit of the other code.

In the foregoing description, the switch of each node establishes a local path for directing a packet to an output port, which is uniquely identified by the label value of the packet, thus establishing a one-to-one relationship between label values and output ports. In a modified embodiment shown in FIG. 16A, a plurality of output ports of a switch 300 are correlated with a label value and each output port is identified uniquely by a combination of the label value and a MAC (media access control) address. Switch 300 is connected to input ports 302 and 304 and output ports 301 and 303. Local user terminals are connected through input and output ports 305 and 306.

Figures 16A, 16B:
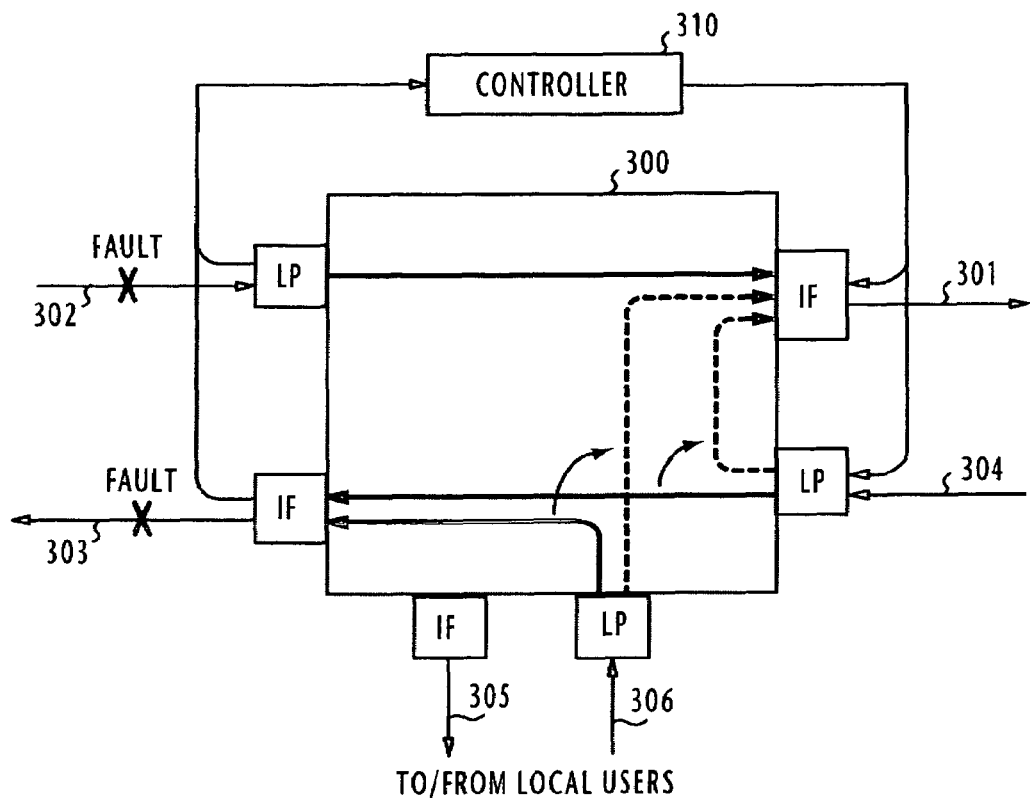
FIG. 16A is a block diagram of a node in which label values plus MAC addresses are jointly used for specifying an output port.
FIG. 16B is an illustration of a MAC address table.

Each of the label processors (LP) associated with the input ports 302, 304 and 306 is provided with a MAC address table 311 shown in FIG. 16B, in addition to the line state table 50 of FIG. 4. MAC address table 311 correlates label values "1000" and "1001" with a plurality of output ports 301, 302 and 303, rather than with a single output of the previous embodiments.

Figure 17:
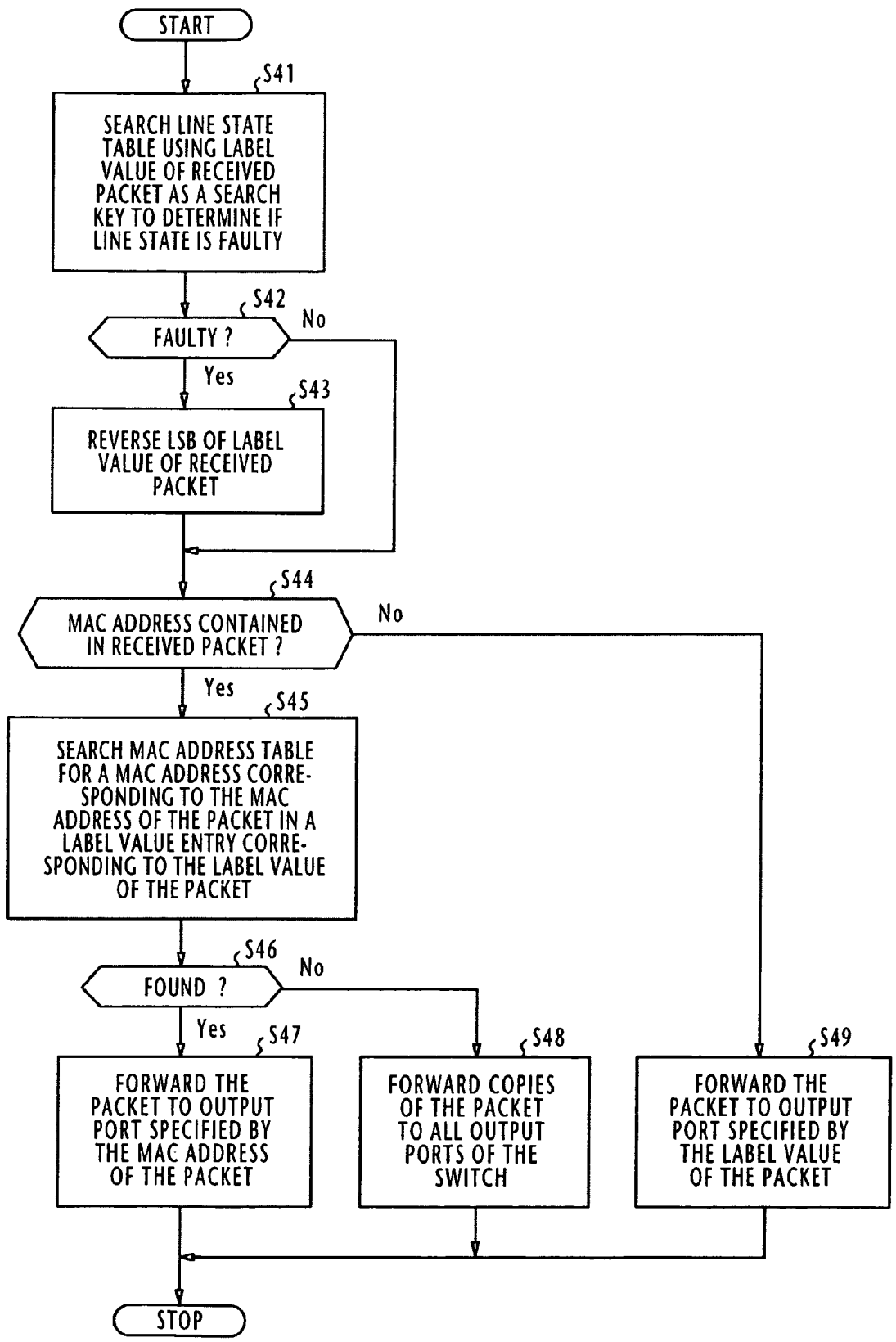
FIG. 17 is a flowchart of the operation of the node of FIG. 16A.

The operation of the system of FIG. 16A proceeds according to the flowchart of FIG. 17. When a packet arrives on one of the input ports 302 and 304, the associated label processor examines the line state table to determine if the output port specified by the label value of the packet is normal or faulty (steps S41, S42). If the specified output port is normal, flow proceeds from step S42 to step S44 to determine if the packet contains a MAC address. If the packet has no MAC address, flow proceeds from step S44 to step S48 to forward copies of the packet to all the output ports of the node in a broadcast mode. During the broadcast mode, a MAC address learning process will begin and a blank of the MAC address table 311 will be filled in. If the packet contains a MAC address, flow proceeds from step S44 to step S45 to search the MAC address table for a MAC address that corresponds to the MAC address of the packet in one of the label value entries that corresponds to the label value of the packet. If the corresponding MAC address is found in the MAC address table 311 (step S46), flow proceeds to step S47 to forward the packet to the output port specified by the MAC address of the packet.

If the corresponding output port is faulty, the decision at step S42 is affirmative and flow proceeds to step S43 to reverse the least significant bit of the label value of the received packet and proceeds to step S44. If the packet has a MAC address, flow proceeds to step S45 for performing a search for a corresponding MAC address in the corresponding label value entry of the MAC address table 311. If the decision is negative (step S46), flow proceeds to step S48 to forward copies of the packet to all output ports of the switch.

Thus, under normal conditions packets having a label value whose least significant bit is "0" and containing no MAC address are routed to the output port 301 and those having a label value whose LSB is "1" containing no MAC address are routed to the output port 303. Packets of label value 1000 with a MAC address #1, #2 or #3 are routed to the output port 303 and packets of label value 1000 with a MAC address #a, #b or #c are routed to the output port 305.

If a failure occurs on the input and output ports 302 and 303 as marked "X" in FIG. 16A, the least significant bit of all arriving packets is reversed so that the label value "1000" of a packet is changed to "1001" at step S43. Therefore, the label value entry "1001" of the MAC address table is examined, instead of the label value entry "1000" (step S45), for all arriving packets whose initial label value is "1000". Thus packets with label value "1000" and no MAC address arrive on input ports 304 and 306, they are respectively diverted to the output port 301 as indicated by dotted lines in FIG. 16A (steps S42, S43, S44, S49). If the arriving packets of label value "1000" contain MAC address #1, #2, #3, #a, #b or #c, the examined label value entry reveals that no output port is specified for these packets (step S45). Hence the decision at step S46 is negative and flow proceeds to step S48 to broadcast these packets to all output ports of the switch 300 (over local paths including those indicated by the dotted lines in FIG. 16A).

By performing a broadcast mode in the event of a link failure by simply changing the LSB value of arriving packets, the contents of the MAC address table 311 are updated in a well-known learning process. Further, the simple switching of the LSB value assists in shortening the length of the broadcast mode and hence the learning time.

In the embodiment of FIGS. 16A, 16B where the available alternate paths are limited in number, the LSB switching can be performed on a per-input-port basis. This procedure is simple, provides fast protection switching and eliminates the need to perform fault management on a per-label-value basis, which is associated with the first embodiment of the present invention.

In a learning process, a label value and a MAC address are combined to create a set with which an output port of the switch is identified. The MAC address table is updated accordingly so that the MAC address of a set is mapped in an entry corresponding to the label value of the set. In this way, the blank fields of the MAC address table 311 will be filled in with MAC addresses newly learned from corresponding label values.

When a MAC address is learned from a given label value forming a first set of label value and MAC address, it is preferable to form a second set of label value and MAC address with the MAC address and the companion label value of the first set Thus, as shown in FIG. 18, the MAC addresses learned from label value "1000" are not only mapped in the label value entry "1000" of a MAC address table 313, but also in the companion label value entry "1001", and those learned from label value "1001" are additionally mapped in the companion label value entry "1000". With this table updating mechanism same MAC addresses are duplicated in different VLANs. Switch 300 can be advantageously implemented with a conventional LAN (Ethernet) switch for updating the MAC address table 313.

What is claimed is:

1. A communications network for establishing a label-switched path defined by a label value contained in a packet, comprising:
   a plurality of transit nodes, each of the nodes comprising:
   a plurality of input ports;
   first and second output ports for respectively defining first and second label-switched paths with at least one downstream node; and
   switch means for monitoring said output ports and switching, from any of said input ports, a packet containing a first label value to said first output port according to a first relationship between said first label value and said first output port if the first output port is normal, rewriting, if said first output port is abnormal, the first label value of the packet with a second label value and switching the packet to said second output port according to a second relationship between said second label value and said second output port, said first and second label values forming a pair of companion label values.

2. The communications network of claim 1, wherein said switch means of said at least one downstream node is responsive to a packet containing said second label value for switching the packet intact to a second output port identified by the second label value of the packet if said second output port is normal, rewriting the second label value of the packet with the first label value if said second output port is abnormal and switching the packet to said first output port according to said first relationship.

3. The communications network of claim 1, wherein said switch means of said at least one downstream node is further responsive to a packet containing said second label value for rewriting the second label value of the packet with said first label value if the first output port of the downstream node is normal and switching the packet to the first output port, and, if the first output port of said at least one downstream node is abnormal, switching the packet intact to said second output port according to said second relationship.

4. The communications network of claim 1, wherein said switch means comprises:
- a switch for switching a packet from any of said input ports to one of said output ports according to a label value contained in the packet;
- a status table for giving normal/failure indications to said first and second output ports; and
- a plurality of label processors respectively associated with said input ports, each of the label processors receiving a packet from the associated input port, forwarding the packet intact to said switch when said first output port is given a normal indication so that the packet is switched to said first output port, and forwarding the packet to said switch after rewriting the first label value with said second label value when said first output port is given a failure indication in said status table so that the packet is switched to said second label-switched path.

5. The communications network of claim 4, wherein each of said label processors is responsive to a packet containing said second label value from a downstream node for forwarding the packet intact to said switch if said second output port is given a normal indication, and forwarding the packet to said switch after rewriting the second label value with said first label value if said second output port is given a failure indication so that the packet is switched to the first output port.

6. The communications network of claim 4, wherein each of said label processors is responsive to a packet containing said second label value from a downstream node for rewriting the second label value of the packet with the first label value if said first output port is given a normal indication and forwarding the packet to said switch, and forwarding said packet containing said second label value intact to said switch if said first output port is given a failure indication.

7. The communications network of claim 1, further comprising:
- a first link for establishing said first label-switched path from the first output port of an upstream node to a first intermediate node;
- a second link for establishing a loopback path from said second output port of said first intermediate node to said upstream node; and
- a third link for establishing said second label-switched path from said second output port of the upstream node to a second intermediate node,
- wherein the switch means of said first intermediate node is responsive to a packet containing said first label value from said upstream node via said first link for rewriting the first label value of the packet with said second label value if said first output port of the first intermediate node is abnormal and switching the packet to said second output port of the first intermediate node according to said second relationship, and
- wherein the switch means of said upstream node is responsive to the packet from the first intermediate node for switching the packet to said second output port of the upstream node according to said second relationship.

8. The communications network of claim 7, wherein the switch means of said upstream node is further responsive to the packet from said first intermediate node for storing information indicating that the first output port of the first intermediate node is abnormal and responsive to a packet containing said first label value from a downstream node for rewriting the first label value of said packet with said second label value if said stored information is present and switching the packet to said second output port according to said second relationship.

9. The communications network of claim 1, further comprising:
- a first plurality of links; and
- a second plurality of links,
- said plurality of nodes connecting the first plurality of links for establishing said first label-switched path in the form of a first unidirectional ring and connecting the second plurality of links for establishing said second label-switched path in the form of a second unidirectional ring whose direction of transmission is opposite to the direction of transmission of said first unidirectional ring,
- wherein the switch means of each of said nodes is responsive to a packet containing said first label value for switching the packet to said first output port of the node if said first output port is normal,
- wherein the switch means of one of a pair of nodes adjacent to a point of failure is responsive to said packet for rewriting the first label value of the packet with said second label value if said first output port is abnormal and switching the packet to said second output port according to said second relationship, whereby the packet is switched at a loopback point from the first label-switched path to the second label-switched path,
- wherein the switch means of a node subsequently receiving the looped-back packet is configured to switch the received packet to said second output port of the node according to said second relationship, and
- wherein the switch means of the other node of said pair of nodes is responsive to said looped-back packet for rewriting the second label value of the received packet with the first label value and switching the packet to said first output port of the node according to said first relationship, whereby the packet is looped back again from the second label-switched path to the first label-switched path.

10. The communications network of claim 9, wherein the switch means of a source node is responsive to a unicast packet containing said second label value for storing information indicating that the first output port is abnormal and responsive to a subsequent unicast packet containing said first label value for rewriting the first label value of the packet with said second label value if said stored information is present and switching the packet to said second output port according to said second relationship.

11. The communications network of claim 1, wherein said label value of the packet is contained in a VLAN (virtual local area network) tag.

12. The communications network of claim 1, wherein said first label-switched path is a working path and said second label-switched path is an alternate path and wherein said packet contains a flag indicating on which of said working and alternate paths said packet is transmitted.

13. The communications network of claim 12, wherein said flag forms part of each of said first and second label values.

14. The communications network of claim 13, wherein each of said first and second label values is a multi-bit code and wherein the least significant bit of the code is used as said flag.

15. The communications network of claim 12, wherein said VLAN tag contains priority data for indicating a priority level of packets diverted from said working path to said alternate path.

16. The communications network of claim 15, wherein said priority level is lower than a priority level of packets transported on said working path.

17. The communications network of claim 12, wherein a node is configured to reverse said flag of a packet when the packet is switched to said alternate path.

18. The communications network of claim 1, wherein each of said transit nodes further comprises a forwarding table for defining correlations between multiple pairs of said first and second label values and said output ports, wherein said switch means is configured to consult said forwarding table for switching a packet according to the defined correlations.

19. The communications network of claim 1, wherein said first and second label values are multi-bit codes identical to each other except for the least significant bit.

20. The communications network of claim 1, wherein said first and second label values are multi-bit codes, wherein every bit of each code is complementary to the corresponding bit of the other code.

21. A communications network for establishing a label-switched path defined by a label value contained in a packet, comprising:
  a plurality of transit nodes, each of the nodes comprising:
  a plurality of input ports;
  a pair of first output ports for defining a pair of first label-switched paths and a pair of second output ports for defining a pair of second label-switched paths with at least one downstream node; and
  switch means for monitoring said output ports and (a) if both of said first output ports are normal, switching from any of said input ports oppositely traveling packets each containing a first label value to said pair of first output ports according to a first relationship between said first label value and said pair of first output ports, (b) if one of said first output ports is abnormal, rewriting the first label value of one of said oppositely traveling packets with a second label value and switching said one packet to one of the second output ports according to a second relationship between said second label value and said pair of second output ports, and rewriting the second label value of the other packet of said oppositely traveling packets with said first label value and switching said the other packet to the other of said first output ports according to said first relationship.

22. The communications network of claim 21, wherein the switch means of an adjacent node is responsive to oppositely traveling packets respectively containing said first and second label values for rewriting the first and second label values of said packets with the second and first label values and respectively switching the packets to one of the first output ports and one of said second output ports.

23. The communications network of claim 21, wherein each of said oppositely traveling packets further contain a first flag when said packets contain said first label values and contain a second flag when said packets contain said second label values.

24. The communications network of claim 21, wherein said oppositely traveling packets further contain priority data indicating a priority level of the packets, and wherein the priority level of said packets, when switched from said pair of first label-switch paths to said pair of second label-switched paths, is lower than the priority level of packets which are oppositely traveling on the second label-switched paths as native traffic.

25. A communications network for establishing a label-switched path defined by a label value contained in a packet, comprising:
  a plurality of transit nodes, each of the nodes comprising:
  a plurality of input ports;
  first and second output ports for respectively defining first and second label-switched paths with downstream nodes; and
  switch means for monitoring said output ports and (a) if both of said output ports are normal, switching from any of said input ports first and second parallel packets respectively containing first and second label values to said first and second output ports according to relationships between said first and second label values and said first and second output ports, and (b) if said first output port is abnormal, rewriting the first label value of the first packet with said second label value and switching both of said first and second packets to the second output port according to the relationship between said second label value and said second output port.

26. The communications network of claim 25, wherein said first and second label values are represented by the node identifier of a destination node plus flags respectively identifying said first and second label-switched paths.

27. The communications network of claim 26, wherein said first and second label values further include a flag indicating that said first and second packets are unicast traffic or multicast traffic.

28. The communications network of claim 25, wherein said first and second parallel further contain priority data indicating a priority level of the packets, and wherein the priority level of said first packet, when switched from said first output port to said second output port, is lower than the priority level of said second packet.

29. A communications network for establishing a label-switched path defined by a label value contained in a packet, comprising:
  a plurality of transit nodes, each of the nodes comprising:
  a plurality of input ports;
  a plurality of output ports for defining a plurality of label-switched paths with at least one downstream node; and
  a MAC (media access control) address table for establishing a first relationship between a first label value plus a first MAC address and associated output ports and a second relationship between a second label value plus a second MAC address and said associated output ports, said first and second label values forming a pair of companion label values;
  switch means for monitoring the output ports and (a) if said output ports are normal, switching from any of said input ports a packet containing said first label value plus said first MAC address to one of said associated output ports according to said first relationship and a packet containing said second label value plus said second MAC address to one of said associated output ports according to said second relationship, and (b) if one of the output ports is abnormal, rewriting the label value of the packet with the companion label value and switching copies of said packet to all of said output ports in a broadcast mode.

30. The communications network of claim 29, wherein said MAC address table is configured to:
  jointly map said first label value and a first MAC address to a first output port of said plurality of output ports;
  jointly map said second label value and said first MAC address to said first output port;
  jointly map said first label value and a second MAC address to a second output port of said plurality of output ports; and
  jointly map said second label value and said second MAC address to said second output port.

31. The communications network of claim 30, wherein said switch means comprises a LAN (local area network) switch.

32. A method of switching packets to an alternate label-switched path of a communications network when a failure occurs on a working label-switched path, comprising the steps of:
  a) defining first and second label-switched paths between first and second output ports of a local node of the network and input ports of at least one downstream node of the network;
  b) establishing a first relationship between a first label value and said first output port and a second relationship between a second label value and said second output port, said first and second label values forming a pair of companion label values;
  c) monitoring said first and second output ports;
  d) if the first output port is normal, switching a packet containing said first label value from any input port of said local node to said first output port according to said first relationship; and
  e) if said first output port is abnormal, rewriting the first label value of the packet with said second label value and switching the packet to said second output port according to said second relationship.

33. A method of switching packets to an alternate label-switched path of a communications network when a failure occurs on a working label-switched path, comprising the steps of:
  a) defining a pair of first label-switched paths between a pair of first output ports of a local node of the network and input ports of downstream nodes of the network and a pair of second label-switched paths between a pair of second output ports of said local node and input ports of said downstream nodes;
  b) establishing a first relationship between a first label value and said pair of first output ports and a second relationship between a second label value and said pair of second output ports;
  c) monitoring said pair of first output ports and said pair of second output ports;
  d) responsive to oppositely traveling packets each containing said first label value arriving at any input port of said local node, switching the packets to said pair of first output ports according to said first relationship if both of said first output ports are normal;
  e) if one of said first output ports is abnormal, rewriting the first label value of one of said oppositely traveling packets with said second label value and switching said one packet to one of the second output ports according to said second relationship; and
  f) rewriting the second label value of the other packet of said oppositely traveling packets with said first label value and switching said the other packet to the other of said first output ports according to said first relationship.

34. A method of switching packets to an alternate label-switched path of a communications network having input and output ports, when a failure occurs on a working label-switched path, comprising the steps of:
  a) defining first and second label-switched paths between first and second output ports of a local node of the network with at least one downstream node;
  b) establishing relationships between said first and second label values and said first and second output ports;
  c) monitoring said output ports;
  d) if both of said output ports are normal, switching from any of said input ports first and second parallel packets respectively containing first and second label values to said first and second output ports according to said relationships; and
  e) if said first output port is abnormal, rewriting the first label value of the first packet with said second label value and switching both of said first and second packets to the second output port according to the relationship between said second label value and said second output port.

35. A method of switching packets to an alternate label-switched path of a communications network when a failure occurs on a working label-switched path, comprising the steps of
  a) defining a plurality of label-switched paths between a plurality of output ports and a plurality of downstream nodes;
  b) establishing a first relationship between a first label value plus a first MAC address and a plurality of associated output ports and a second relationship between a second label value plus a second MAC address and said plurality of associated output ports, wherein the first and second label values form a pair of companion label values;
  c) monitoring the output ports;
  d) if the output ports are normal, switching from any of said input ports a packet containing one of said first and second label values and one of said first and second MAC addresses to one of said associated output ports according to one of said first and second relationships; and
  e) if one of the output ports is abnormal, rewriting the label value of the packet with the companion label value and switching copies of said packet to all of said output ports in a broadcast mode.

36. A network node for a label-switched path communications network for establishing a label-switched path defined by a label value contained in a packet, comprising:
  a plurality of input ports;
  first and second output ports for respectively defining first and second label-switched paths with at least one downstream node; and
  switch means for monitoring said output ports and switching, from any of said input ports, a packet containing a first label value to said first output port according to a first relationship between said first label value and said first output port if the first output port is normal, rewriting, if said first output port is abnormal, the first label value of the packet with a second label value and switching the packet to said second output port according to a second relationship between said second label value and said second output port, said first and second label values forming a pair of companion label values.

37. A network node for a label-switched path communications network for establishing a label-switched path defined by a label value contained in a packet, comprising:
  a plurality of input ports;
  a pair of first output ports for defining a pair of first label-switched paths and a pair of second output ports for defining a pair of second label-switched paths with at least one downstream node; and
  switch means for monitoring said output ports and (a) if both of said first output ports are normal, switching from any of said input ports oppositely traveling packets each containing a first label value to said pair of first output ports according to a first relationship between said first label value and said pair of first output ports, (b) if one of said first output ports is abnormal, rewriting the first label value of one of said oppositely traveling packets with a second label value and switching said one packet to one of the second output ports according to a second relationship between said second label value and said pair of second output ports, and rewriting the second label value of the other packet of said oppositely traveling packets with said first label value and switching said the other packet to the other of said first output ports according to said first relationship.

38. A network node for a label-switched path communications network for establishing a label-switched path defined by a label value contained in a packet, comprising:
- a plurality of input ports;
- first and second output ports for respectively defining first and second label-switched paths with downstream nodes; and
- switch means for monitoring said output ports and (a) if both of said output ports are normal, switching from any of said input ports first and second parallel packets respectively containing first and second label values to said first and second output ports according to relationships between said first and second label values and said first and second output ports, and (b) if said first output port is abnormal, rewriting the first label value of the first packet with said second label value and switching both of said first and second packets to the second output port according to the relationship between said second label value and said second output port.

39. A network node for a label-switched path communications network for establishing a label-switched path defined by a label value contained in a packet, comprising:
- a plurality of input ports;
- a plurality of output ports for defining a plurality of label-switched paths with at least one downstream node;
- a MAC (media access control) address table for establishing a first relationship between a first label value plus a first MAC address and output ports and a second relationship between a second label value plus a second MAC address and said associated output ports, said first and second label values forming a pair of companion label values; and
- switch means for monitoring the output ports and (a) if said output ports are normal, switching from any of said input ports a packet containing said first label value plus said first MAC address to one of said associated output ports according to said first relationship and a packet containing said second label value plus said second MAC address to one of said associated output ports according to said second relationship, and (b) if one of the output ports is abnormal, rewriting the label value of the packet with the companion label value and switching copies of said packet to all of said output ports in a broadcast mode.

* * * * *